United States Patent
Shiomi

(10) Patent No.: US 10,218,016 B2
(45) Date of Patent: Feb. 26, 2019

(54) FUEL CELL SYSTEM AND CONTROL METHOD FOR FUEL CELL SYSTEM

(71) Applicant: NISSAN MOTOR CO., LTD., Yokohama-shi, Kanagawa (JP)

(72) Inventor: Takeshi Shiomi, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/781,838

(22) PCT Filed: Nov. 8, 2016

(86) PCT No.: PCT/JP2016/083122
§ 371 (c)(1),
(2) Date: Jun. 6, 2018

(87) PCT Pub. No.: WO2017/104301
PCT Pub. Date: Jun. 22, 2017

(65) Prior Publication Data
US 2018/0358640 A1    Dec. 13, 2018

(30) Foreign Application Priority Data
Dec. 15, 2015 (JP) .................. 2015-244426

(51) Int. Cl.
*H01M 8/04746* (2016.01)
*H01M 8/0438* (2016.01)
*H01M 8/04303* (2016.01)
*H01M 8/04701* (2016.01)
*H01M 8/04082* (2016.01)
*H01M 8/0432* (2016.01)

(52) U.S. Cl.
CPC ... *H01M 8/04761* (2013.01); *H01M 8/04201* (2013.01); *H01M 8/04303* (2016.02); *H01M 8/04328* (2013.01); *H01M 8/04388* (2013.01); *H01M 8/04432* (2013.01); *H01M 8/04738* (2013.01); *H01M 8/04776* (2013.01)

(58) Field of Classification Search
None
See application file for complete search history.

(56) References Cited

U.S. PATENT DOCUMENTS

| | | |
|---|---|---|
| 2012/0003554 A1 | 1/2012 | Ozeki et al. |
| 2014/0113162 A1 | 4/2014 | Hottinen et al. |
| 2015/0086887 A1 | 3/2015 | Matsuo et al. |

FOREIGN PATENT DOCUMENTS

| | | |
|---|---|---|
| JP | 2006-140065 A | 6/2006 |
| JP | 2007-109428 | 4/2007 |
| JP | 2011-76846 A | 4/2011 |
| JP | 2013-225486 A | 10/2013 |

*Primary Examiner* — Sarah A. Slifka
(74) *Attorney, Agent, or Firm* — Foley & Lardner LLP

(57) ABSTRACT

A fuel cell system has an oxidant supplying device configured to supply oxidant gas to a fuel cell, a fuel supplying device configured to supply fuel gas to the fuel cell and a combustor configured to burn fuel off-gas and oxidant off-gas discharged from the fuel cell and discharge thereof. The a control method for the fuel cell system includes a power generation control step of supplying the fuel gas and the oxidant gas to the fuel cell and causing the fuel cell to generate power. The a control method further includes a stop control step of stopping the supply of the fuel gas to the fuel cell and supplying the oxidant gas to the combustor on the basis of an amount of unburned fuel gas of the fuel cell system in the case of stopping the fuel cell system.

16 Claims, 10 Drawing Sheets

FUEL CELL SYSTEM AND CONTROL METHOD FOR FUEL CELL SYSTEM

TECHNICAL FIELD

The present invention relates to a fuel cell system for burning and discharging fuel gas discharged from a fuel cell and a control method for fuel cell system.

BACKGROUND ART

The specification of U.S. Unexamined Patent Application Publication 2014/0113162 discloses that an anode flow passage is kept in a reducing atmosphere to prevent the oxidation of an anode of a fuel cell in the case of stopping a fuel cell system.

SUMMARY OF INVENTION

In the fuel cell system as described above, it is known to stop the supply of fuel gas and oxidant gas to the fuel cell in the case of stopping the operation of the fuel cell. However, after the stop of the supply of the fuel gas, unburned fuel gas before being used for power generation of the fuel cell stays inside the fuel cell system. Thus, in supplying the fuel gas to the fuel cell anew when the fuel cell system is started next time, there is a problem that the unburned fuel gas is discharged to the atmosphere.

The present invention was developed focusing on such a problem. The present invention aims to provide a fuel cell system for suppressing the discharge of unburned fuel gas from the fuel cell system and a control method for fuel cell system.

According to one aspect of the present invention, a fuel cell system has an oxidant supplying device configured to supply oxidant gas to a fuel cell, a fuel supplying device configured to supply fuel gas to the fuel cell and a combustor configured to burn fuel off-gas and oxidant off-gas discharged from the fuel cell and discharge thereof. The a control method for the fuel cell system includes a power generation control step of supplying the fuel gas and the oxidant gas to the fuel cell and causing the fuel cell to generate power, and a stop control step of stopping the supply of the fuel gas to the fuel cell and supplying the oxidant gas to the combustor on the basis of an amount of unburned fuel gas of the fuel cell system in the case of stopping the fuel cell system.

DESCRIPTION OF EMBODIMENTS

Hereinafter, embodiments of the present invention are described with reference to the accompanying drawings.

First Embodiment

Figure 1:
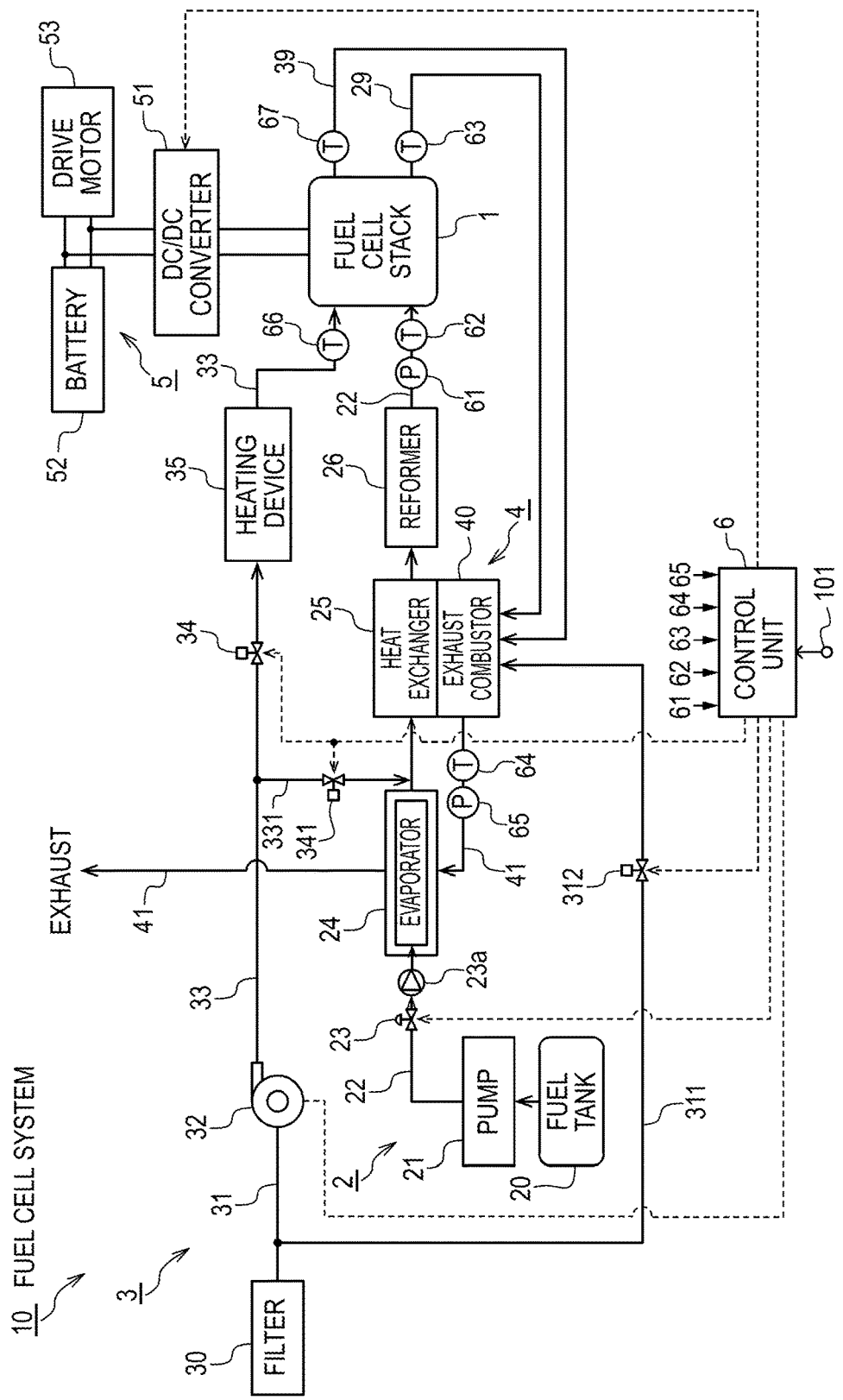
FIG. 1 is a block diagram showing a main configuration of a fuel cell system in a first embodiment of the present invention.

FIG. 1 is a block diagram showing a main configuration of a fuel cell system 10 in a first embodiment of the present invention.

The fuel cell system 10 of the present embodiment is a solid oxide fuel cell system. The fuel cell system 10 includes a fuel supplying system 2 configured to supply anode gas (fuel gas) to a fuel cell stack 1 and an oxidant supplying system 3 configured to supply cathode gas (oxidant gas) to the fuel cell stack 1. Further, the fuel cell system 10 includes an exhausting system 4 configured to discharge anode off-gas (fuel off-gas) and cathode off-gas (oxidant off-gas) discharged from the fuel cell stack 1 to outside, a driving system 5 configured to extract power from the fuel cell stack 1 and ensure a drive force for a load, and a control unit 6 configured to control an entire operation in the fuel cell system 10.

The fuel cell stack 1 is a solid oxide fuel cell (SOFC). The fuel cell stack 1 is formed by laminating a plurality of cells each configured such that an electrolyte layer formed of solid oxide such as ceramic is sandwiched by an anode electrode (fuel electrode) and a cathode electrode (air electrode).

Anode gas reformed by a reformer 26 is supplied to an anode electrode of the fuel cell stack 1 and air containing oxygen as cathode gas is supplied to a cathode electrode of the fuel cell stack 1. In the fuel cell stack 1, hydrogen contained in the anode gas and oxygen contained in the cathode gas are reacted to generate power and the anode off-gas and the cathode off-gas generated after the reaction are discharged to outside.

Thus, an anode gas supply passage 22 and an anode gas discharge passage 29 constituting a passage in which the anode gas flows and a cathode gas supply passage 33 and a cathode gas discharge passage 39 constituting a passage in which the cathode gas flows are connected to manifolds at both electrodes formed in the fuel cell stack 1.

The anode gas supply passage 22 is a path for supplying the anode gas to the fuel cell stack 1, and the anode gas discharge passage 29 is a path for introducing the anode off-gas discharged from the fuel cell stack 1 to an exhaust combustor 40. Further, the cathode gas supply passage 33 is a path for supplying the cathode gas to the fuel cell stack 1 and the cathode gas discharge passage 39 is a discharge passage for introducing the cathode off-gas discharged from the fuel cell stack 1 to the exhaust combustor 40.

The fuel supplying system 2 is a fuel supplying device configured to supply the anode gas to the fuel cell stack 1.

The fuel supplying system 2 includes a fuel tank 20, a pump 21, the anode gas supply passage 22, a fuel supply valve 23, an evaporator 24, a heat exchanger 25 and the reformer 26.

The fuel tank 20 stores liquid containing fuel. For example, reforming fuel formed from liquid obtained by mixing ethanol and water is stored in the fuel tank 20.

The pump 21 sucks the reforming fuel and supplies the reforming gas at a fixed pressure to the fuel supplying system 2.

The anode gas supply passage 22 is a fuel passage for passing the anode gas to the fuel cell stack 1. The fuel supply valve 23, the evaporator 24, the heat exchanger 25 and the reformer 26 are provided in the anode gas supply passage 22.

The fuel supply valve 23 supplies the reforming fuel supplied from the pump 21 to an injection nozzle 23a and injects the reforming fuel to the evaporator 24 by the injection nozzle 23a.

The evaporator 24 vaporizes the reforming fuel, utilizing heat of discharged gas discharged from the exhaust combustor 40.

The heat exchanger 25 has heat supplied thereto from the exhaust combustor 40 and further heats the vaporized reforming fuel for reforming in the reformer 26.

The reformer 26 reforms the reforming fuel into anode gas containing hydrogen by a catalytic reaction and supplies the anode gas to the anode electrode of the fuel cell stack 1. In the reformer 26 of the present embodiment, steam reforming is performed to reform the fuel using steam. To perform steam reforming, at least 2 mol of steam (S) is necessary for 1 mol of carbon (C) contained in the reforming fuel. In such a situation where stream necessary for steam reforming is lacking in the reformer 26, partial oxidation reforming is performed while fuel is burned using air instead of stream.

A pressure sensor 61 and a temperature sensor 62 are provided in the anode gas supply passage 22 located between the reformer 26 and the fuel cell stack 1.

The pressure sensor 61 detects a pressure of the anode gas to be supplied to the fuel cell stack 1. The pressure sensor 61 of the present embodiment detects a pressure in the anode gas supply passage 22. A detection value of the pressure sensor 61 is referred to as a "stack inlet anode pressure" below. The stack inlet anode pressure detected by the pressure sensor 61 is output to the control unit 6.

The temperature sensor 62 detects a temperature of the anode gas to be supplied to the fuel cell stack 1. A detection value of the temperature sensor 62 is referred to as a "stack inlet temperature" below. The stack inlet temperature detected by the temperature sensor 62 is output to the control unit 6.

A temperature sensor 63 is provided also in the anode gas discharge passage 29 located between the fuel cell stack 1 and the exhaust combustor 40. The temperature sensor 63 detects a temperature of the anode off-gas discharged from the fuel cell stack 1. A detection value of the temperature sensor 63 is referred to as a "stack outlet temperature" below. The stack outlet temperature detected by the temperature sensor 63 is output to the control unit 6.

The oxidant supplying system 3 is an oxidant supplying device configured to supply the oxidant gas to the fuel cell stack 1.

The oxidant supplying system 3 includes a filter 30, an air intake passage 31, a compressor 32, the cathode gas supply passage 33, a cathode flow rate control valve 34, a heating device 35, a reforming temperature control air passage 311 and a combustor air control valve 312. Further, the oxidant supplying system 3 includes an oxidation reforming passage 331 and an anode system air supply valve 341.

The filter 30 removes foreign matters of outside air and introduces the resultant outside air into the fuel cell system 10.

The air intake passage 31 is a passage for passing the air having the foreign matters removed therefrom by the filter 30 to the compressor 32. One end of the air intake passage 31 is connected to the filter 30 and the other end is connected to a suction port of the compressor 32.

The compressor 32 is an actuator for supplying the cathode gas to the fuel cell stack 1. In the present embodiment, the compressor 32 takes in outside air through the filter 30 and supplies the air to the fuel cell stack 1 and the like. It should be noted that although the compressor for feeding air under pressure is used in the present embodiment as the actuator for supplying the cathode gas to the fuel cell stack 1, the actuator only has to be a device capable of supplying the cathode gas to the fuel cell stack 1 and may be an air blower, a pump or the like.

The cathode flow rate control valve 34 is a control valve for controlling a flow rate of the cathode gas to be supplied to the fuel cell stack 1. For example, the cathode flow rate control valve 34 is constituted by an electromagnetic valve. An opening degree of the cathode flow rate control valve 34 can be changed in a stepwise manner and is controlled by the control unit 6.

The heating device 35 is a device for heating the cathode gas to be supplied to the fuel cell stack 1 so that a temperature of that cathode gas is suitable for power generation of the fuel cell stack 1. For example, the heating device 35 is realized by a heat exchanger for exchanging heat between supplied gas to the cathode of the fuel cell stack 1 and discharged gas from the fuel cell stack 1, a combustor for heating the supplied gas by burning the fuel gas, a combustor for heating the supplied gas utilizing heat of a catalytic reaction or the like.

A temperature sensor 66 is provided in the cathode gas supply passage 33 located between the heating device 35 and the fuel cell stack 1. The temperature sensor 66 detects a temperature of the cathode gas to be supplied to the fuel cell stack 1. A detection value of the temperature sensor 66 is referred to as a "cathode inlet temperature" below. The cathode inlet temperature detected by the temperature sensor 66 is output to the control unit 6.

The reforming temperature control air passage 311 is an air passage provided to adjust a temperature of the fuel gas to be supplied to the reformer 26 to a temperature necessary for a reforming reaction. The reforming temperature control air passage 311 is a bypass passage branched from the air intake passage 31 and connected to the exhaust combustor 40. It should be noted that although the reforming temperature control air passage 311 is connected to the exhaust combustor 40 in the present embodiment, the reforming temperature control air passage 311 may join the cathode gas discharge passage 39.

The combustor air control valve 312 is a control valve for supplying or shutting off air to the exhaust combustor 40. The combustor air control valve 312 is controlled to open and close by the control unit 6. The exhaust combustor 40 requires oxygen since the exhaust combustor 40 burns and heats the fuel gas. Oxygen in the cathode off-gas may be lacking at the time of starting the fuel cell system 10 or during normal power generation. Since it becomes difficult to sufficiently burn the anode off-gas in such a case, the combustor air control valve 312 is opened to supply combustion promoting gas (oxygen) to the exhaust combustor 40. In this way, unburned fuel gas in the anode off-gas can be properly burned in the exhaust combustor 40 at the time of starting the fuel cell system 10 or during normal power generation.

The oxidation reforming passage 331 is provided to supplement air as an alternative to stream such as when steam necessary for the stream reforming reaction in the reformer 26 is lacking. The oxidation reforming passage 331 is a branch passage branched from the cathode gas supply passage 33 and joining a part of the anode gas supply passage 22 upstream of the reformer 26. In the present embodiment, one end of the oxidation reforming passage 331 is connected between the compressor 32 and the cathode flow rate control valve 34 and the other end is connected to the anode gas supply passage 22 between the evaporator 24 and the heat exchanger 25.

The anode system air supply valve 341 is a control valve for supplying all or part of the air discharged from the compressor 32 to the cathode gas supply passage 33 to the anode gas supply passage 22. In the present embodiment, the anode system air supply valve 341 supplies the air as an alternative to stream necessary for reforming the reformer 26 to the anode gas supply passage 22. The anode system air supply valve 341 is, for example, constituted by an electromagnetic valve. An opening degree of the anode system air supply valve 341 can be changed in a stepwise manner and is controlled by the control unit 6.

The exhausting system 4 includes the anode gas discharge passage 29 and the cathode gas discharge passage 39 described above, the exhaust combustor 40 and an exhaust passage 41.

The exhaust combustor 40 generates discharged gas mainly containing carbon dioxide and water by mixing the anode off-gas and the cathode off-gas and catalytically burning that mixture gas, and transfers heat by catalytic combustion to the heat exchanger 25. The exhaust combustor 40 discharges discharged gas (post-combustion gas) generated after combustion to the exhaust passage 41.

The exhaust passage 41 is a passage for discharging the discharged gas from the exhaust combustor 40 to outside air. The exhaust passage 41 passes through the evaporator 24 and is connected to an unillustrated muffler. In this way, the evaporator 24 is heated by the discharged gas from the exhaust combustor 40.

A temperature sensor 64 and a pressure sensor 65 are provided in the exhaust passage 41 located between the exhaust combustor 40 and the evaporator 24. The temperature sensor 64 detects a temperature of the discharged gas discharged from the exhaust combustor 40. A detection value of the temperature sensor 64 is referred to as a "combustor outlet temperature" below. The combustor outlet temperature detected by the temperature sensor 64 is output to the control unit 6.

The pressure sensor 65 detects a pressure of the discharged gas discharged from the exhaust combustor 40. A detection value of the pressure sensor 65 is referred to as a "combustor outlet pressure" below. The combustor outlet pressure detected by the pressure sensor 65 is output to the control unit 6.

A temperature sensor 67 is also provided in the cathode gas discharge passage 39 located between the fuel cell stack 1 and the exhaust combustor 40. The temperature sensor 67 detects a temperature of the cathode off-gas discharged from the fuel cell stack 1. A detection value of the temperature sensor 67 is referred to as a "cathode outlet temperature" below. The cathode outlet temperature detected by the temperature sensor 67 is output to the control unit 6.

The driving system 5 is an electrical load connected to the fuel cell stack 1 and, in the present embodiment, includes a DC/DC converter 51, a battery 52 and a drive motor 53.

The DC/DC converter 51 is a power controller connected to the fuel cell stack 1 and configured to extract generated power from the fuel cell stack 1. The DC/DC converter 51 steps up an output voltage of the fuel cell stack 1 and supplies the generated power to at least one of the battery 52 and the drive motor 53.

The battery 52 is charged with the power supplied from the DC/DC converter 51. Further, the battery 52 supplies the accumulated power to the drive motor 53.

The drive motor 53 is connected to the battery 52 and the DC/DC converter 51 via an unillustrated inverter. The drive motor 53 is a power source for driving a vehicle. Further, the drive motor 53 can generate regenerative power at the time of braking the vehicle and charge this regenerative power into the battery 52.

The control unit 6 is constituted by a general-purpose electronic circuit including a microcomputer, a microprocessor and a CPU and peripheral devices and performs a process for controlling the fuel cell system 10 by executing a specific program.

In the present embodiment, the control unit 6 receives output signals from various sensors including the pressure sensors 61 and 65 and the temperature sensors 62, 63 and 64 and controls operating states of the fuel supplying system 2, the oxidant supplying system 3, the exhausting system 4 and the driving system 5 according to these signals.

Further, an operation unit 101 configured to output a start-up command signal or a stop command signal of the fuel cell system 10 is connected to the control unit 6. The operation unit 101 includes an unillustrated EV (Electric Vehicle) key, outputs a start-up command signal to the control unit 6 when the EV key is turned on by a passenger and outputs a stop command signal to the control unit 6 when the EV key is turned off.

The control unit 6 executes a start-up control of starting the fuel cell system 10 in the case of receiving the start-up command signal from the operation unit 101 and executes a normal power generation control according to a state of the driving system 5 after the start-up control is completed.

For example, the control unit 6 causes the fuel cell stack 1 to generate power by supplying the anode gas and the cathode gas to the fuel cell stack 1 and supplies the generated power to the battery 52 if a charge capacity (e.g. SOC) of the battery 52 falls below a predetermined threshold value. In this case, the control unit 6 increases the amount of power generation of the fuel cell stack 1 as required power required to the fuel cell stack 1 from the drive motor 53 increases. For example, the required power of the drive motor 53 increases as an accelerator pedal is depressed more.

On the other hand, the control unit 6 temporarily stops the power generation of the fuel cell stack 1 until the charge capacity of the battery 52 falls below a charge threshold value if the charge capacity of the battery 52 increases above a predetermined threshold value. It should be noted that the control unit 6 may continue the power generation of the fuel cell stack 1 if the required power of the drive motor 53 is larger than a predetermined value even when the charge capacity of the battery 52 increases above the predetermined threshold value.

Further, the control unit 6 executes a stop control of stopping the operation of the fuel cell system 10 in the case of receiving a stop command signal from the operation unit 101.

Generally, the fuel cell system may be configured to stop the supply of the anode gas to the fuel cell stack 1 and stop the discharge of fuel off-gas to the exhaust combustor 40 from the fuel cell stack 1 during the stop control. The discharge of the fuel off-gas is stopped because oxygen may possibly flow back to the anode gas discharge passage 29 through the exhaust combustor 40 from the cathode gas discharge passage 39, the exhaust passage 41 or the like as the supply of the anode gas is stopped. Thus, the discharge of the fuel off-gas to the exhaust combustor 40 is stopped to suppress the oxidation of the anode electrode of the fuel cell stack 1.

However, if the supply of the anode gas is stopped in the stop control, unburned fuel gas and the like stay in the fuel cell stack 1 and the anode gas supply passage 22 including the reformer 26. Particularly, not only hydrogen, but also a large amount of the unburned fuel gas such as carbon monoxide or methanol stays inside the reformer 26. In such a state, if the start-up control of the fuel cell system 10 is executed by turning on the EV key, the unburned fuel gas staying in the anode gas supply passage 22 is discharged to the atmosphere from the fuel cell system 10 when the supply of the anode gas to the fuel cell stack 1 is started.

In contrast, the control unit 6 of the present embodiment supplies air to the exhaust combustor 40 on the basis of the amount of the unburned fuel gas staying in the fuel cell system 10 while stopping the supply of the anode gas to the fuel cell stack 1 in the case of stopping the fuel cell system 10. By supplying air to the exhaust combustor 40 in accordance with the amount of the unburned fuel gas in this way, the anode off-gas discharged to the exhaust combustor 40 from the fuel cell stack 1 can be burned and an internal temperature of the exhaust combustor 40 can be maintained at a temperature necessary for catalytic combustion.

Figure 2:
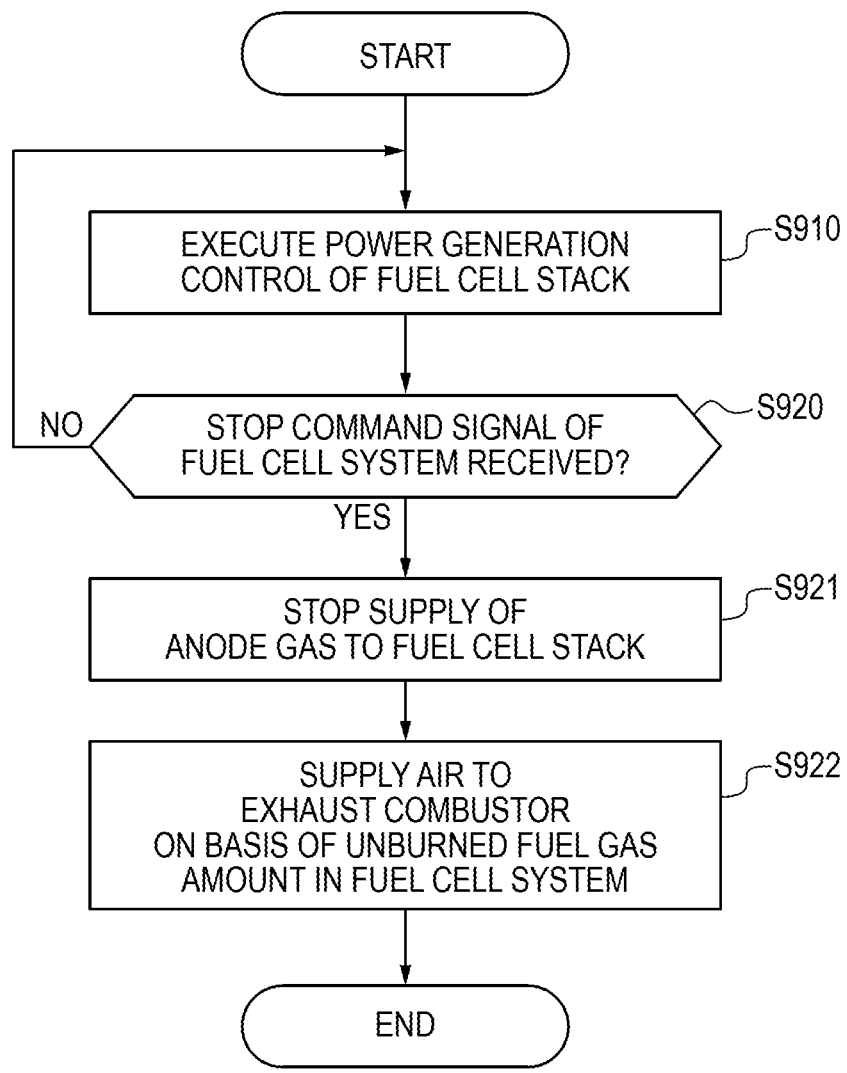
FIG. 2 is a flow chart showing an example of a method for stopping the fuel cell system in the first embodiment.

FIG. 2 is a flow chart showing an example of a process procedure relating to a method for stopping the fuel cell system 10 in the present embodiment. The process procedure of this stopping method is repeated in a predetermined cycle, e.g. every several ms (milliseconds).

In Step S910, the control unit 6 causes the fuel cell stack 1 to generate power according to a load by supplying the anode gas and the cathode gas to the fuel cell stack 1. Specifically, the control unit 6 executes a power generation control of the fuel cell stack 1.

In the present embodiment, the control unit 6 drives the compressor 32 and opens the cathode flow rate control valve 34 according to the states of the battery 52 and the drive motor 53. In this way, air serving as the cathode gas is heated by the heating device 35 and supplied to the cathode electrode of the heated fuel cell stack 1.

Further, the control unit 6 drives the pump 21 and opens the fuel supply valve 23 according to the states of the battery 52 and the drive motor 53. In this way, the reforming fuel supplied from the fuel tank 20 is vaporized by the evaporator 24 and the vaporized reforming fuel is heated by the heat exchanger 25. Then, the heated reforming fuel is reformed into anode gas in the reformer 26 and this anode gas is supplied to the anode of the fuel cell stack 1.

In the fuel cell stack 1 to which the anode gas and the cathode gas are supplied, power is generated by an electrochemical reaction, the generated power is supplied to the DC/DC converter 51 and the anode off-gas and the cathode gas used in the electrochemical reaction are introduced to the exhaust combustor 40.

In Step S920, the control unit 6 judges whether or not a stop command signal of the fuel cell system 10 has been received from the operation unit 101. If the control unit 6 has received no stop command signal, return is made to Step S910 to continue the power generation control.

In Step S921, the control unit 6 stops the supply of the anode gas to the fuel cell stack 1 if the stop command signal of the fuel cell system 10 has been received. In the present embodiment, the control unit 6 closes the anode system air supply valve 341, stops the driving of the pump 21 and closes the fuel supply valve 23 when receiving the stop command signal. In this way, the supply of the fuel to the evaporator 24 is stopped, wherefore the supply of the anode gas to the fuel cell stack 1 is stopped.

In Step S922, the control unit 6 supplies air to the exhaust combustor 40 on the basis of the amount of the unburned fuel gas staying in the fuel cell system 10 after stopping the supply of the anode gas to the fuel cell stack 1. In this way, the anode off-gas discharged from the fuel cell stack 1 can be properly burned in the exhaust combustor 40 in the stop control of the fuel cell system 10.

The above amount of the unburned fuel gas may be given by obtaining the amount of the unburned fuel gas remaining in the anode gas flow passage from the fuel supply valve 23 to the exhaust combustor 40 by an experiment. At this time, mapping of the amount of the unburned fuel gas for each temperature of the fuel cell stack 1 when a stop command is given and for each injection amount of the fuel supply valve 23 immediately before the stop command is given may be stored in a computer and the amount of the unburned fuel gas corresponding to a temperature state of the fuel cell stack 1 when the stop command is given may be called up. In an actual control, a flow rate of the oxidant gas to be supplied to the exhaust combustor 40 may be set according to the amount of the unburned fuel gas called up from a map. It should be noted that a flow rate of the oxidant gas to be supplied to the exhaust combustor 40 may be directly mapped. Besides, how much unburned fuel gas remains after the stop command may be calculated in consideration of a volume of the anode gas flow passage formed in the fuel cell stack 1, a state of the fuel supplying system 2 (evaporator 24 and the like) and a rate of fuel injected immediately before the stop command being unburned fuel or the like.

To burn the anode off-gas in the exhaust combustor 40, the control unit 6, for example, continues to drive the compressor 32 and controls the opening degree of the cathode flow rate control valve 34 on the basis of the amount of the unburned fuel gas of the fuel cell system 10. Since air at a flow rate necessary to burn the unburned fuel gas is supplied to the exhaust combustor 40 via the fuel cell stack 1 in this way, the anode off-gas can be reliably burned in the exhaust combustor 40. Alternatively, the control unit 6 may supply air to the exhaust combustor 40, utilizing the reforming temperature control air passage 311 without via the fuel cell stack 1 by opening the combustor air control valve 312 on the basis of the amount of the unburned fuel gas of the fuel cell system 10.

On the other hand, since the fuel is vaporized in the evaporator 24 immediately after the supply of the anode gas is stopped, a pressure in the anode gas supply passage 22 downstream of the evaporator 24 is maintained to be higher than the outlet pressure of the exhaust combustor 40. Thus, the unburned fuel gas staying in the anode gas supply passage 22 is discharged as the anode off-gas to the exhaust combustor 40 via the anode electrode of the fuel cell stack 1. In this way, the unburned gas staying in the reformer 26 and the unburned fuel gas such as the anode gas staying in the fuel cell stack 1 can be burned in the exhaust combustor 40 and discharged to the outside air as the supply of the anode gas is stopped. Thus, when the EV key is turned on again to execute the start-up control after the stop of the fuel cell system 10, the discharge of the unburned fuel gas from the fuel cell system 10 to the outside air can be suppressed.

As just described, the control unit 6 operates the exhaust combustor 40 on the basis of the amount of the unburned fuel gas staying in the fuel cell system 10 while stopping the supply of the anode gas to the fuel cell stack 1 in the case of stopping the operation of the fuel cell system 10.

It should be noted that, after receiving the stop command signal of the fuel cell system 10 in Step S920, the control unit 6 may stop the supply of air to the fuel cell stack 1 by stopping the driving of the compressor 32.

According to the first embodiment of the present invention, the fuel cell system 10 includes the oxidant supplying system 3 for supplying the oxidant gas to the fuel cell stack 1, the fuel supplying system 2 for supplying the fuel gas to the fuel cell stack 1 and the exhaust combustor 40 for burning and discharging the mixture gas of the anode off-gas and the cathode gas discharged from the fuel cell stack 1 and introduced thereto. The control unit 6 of the fuel cell system 10 performs a power generation control step of causing the fuel cell stack 1 to generate power by supplying the fuel gas and the oxidant gas to the fuel cell stack 1. In the case of stopping the fuel cell system 10, the control unit 6 performs a stop control step of stopping the supply of the anode gas to the fuel cell stack 1 and supplying air serving as the cathode gas to the exhaust combustor 40 on the basis of the amount of the unburned fuel gas remaining in the fuel cell system 10.

As just described, by supplying air at the flow rate corresponding to the amount of the unburned fuel gas remaining in the fuel cell system 10 from the oxidant supply system 3 to the exhaust combustor 40 in the stop control step, the anode off-gas discharged through the fuel cell stack 1 can be burned in the exhaust combustor 40. Thus, the unburned fuel gas staying inside the fuel cell system 10 becomes less after the stop control is finished, wherefore a discharge amount of the unburned fuel gas when the fuel cell system 10 is started next time can be suppressed.

Further, since a supply amount of air to the exhaust combustor 40 is set in consideration of the amount of the unburned fuel gas staying in the fuel supplying system 2 when the supply of the anode gas is stopped, a situation can be avoided where air is supplied more than necessary to the exhaust combustor 40 to excessively lower the temperature of the exhaust combustor 40. Thus, the unburned fuel gas can be reliably burned and discharged while the internal temperature of the exhaust combustor 40 is maintained at a temperature at which the unburned fuel gas can be appropriately burned.

As just described, since incomplete combustion of the unburned fuel gas is less likely to occur due to a temperature drop and the shortage of air in the exhaust combustor 40, the discharge of the unburned fuel gas to the atmosphere from the exhaust combustor 40 can be suppressed during the stop control of the fuel cell system 10. Thus, the discharge of the unburned fuel gas to the atmosphere from the fuel cell system 10 can be suppressed.

Further, according to the present embodiment, the control unit 6 may supply air as the oxidant gas to the exhaust combustor 40, utilizing the reforming temperature control air passage 311 which is a bypass flow passage of the fuel cell stack 1. This enables the exhaust combustor 40 to be warmed without cooling the fuel cell stack 1 in the case of executing a process of maintaining the temperature of the fuel cell stack 1 for a specific period, assuming a restart immediately after the stop command. Thus, a time required for a restart-up control immediate after the stop command can be shortened.

Second Embodiment

Figure 3:
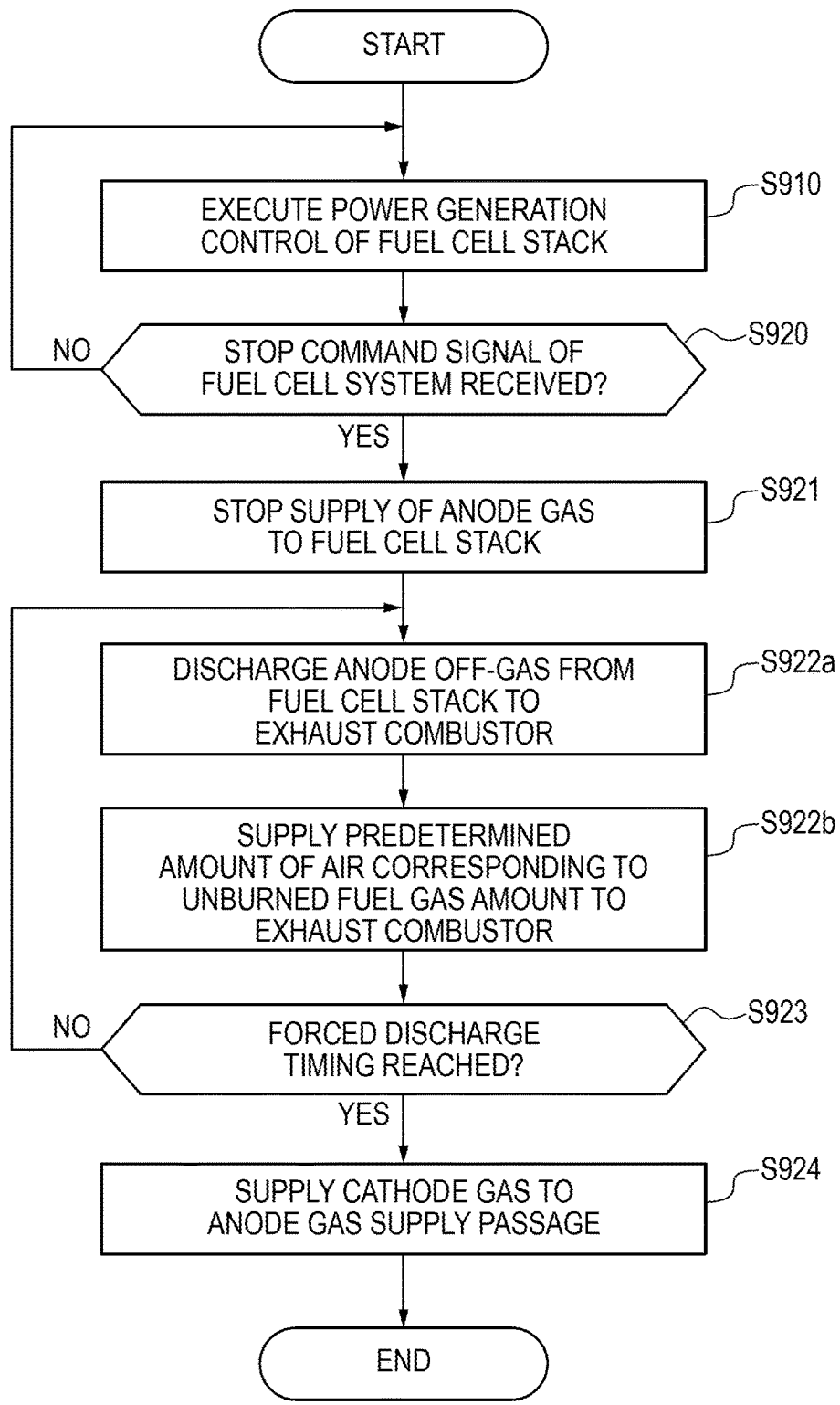
FIG. 3 is a flow chart showing an example of a method for stopping a fuel cell system in a second embodiment.

FIG. 3 is a flow chart showing a process procedure example relating to a method for stopping a fuel cell system in a second embodiment of the present invention. A basic configuration of the fuel cell system of the present embodiment is the same as the configuration of the fuel cell system 10 shown in FIG. 1. The same components as those of the fuel cell system 10 shown in FIG. 1 are denoted by the same reference signs and not described in detail below.

The method for stopping the fuel cell system 10 of the present embodiment includes Steps S923 and S924 in addition to Steps S910, S920 and S921 shown in FIG. 2. Further, this method includes Steps S922a and S922b instead of Step S922. Here, only a processing of each of Steps S922a, S922b, S923 and S924 is described in detail.

In Step S922a, a control unit 6 discharges anode off-gas from a fuel cell stack 1 to an exhaust combustor 40 after stopping the supply of anode gas to the fuel cell stack 1.

In Step S922b, the control unit 6 supplies a predetermined amount of air necessary to burn unburned fuel gas staying in the fuel cell system 10 to the exhaust combustor 40 when the supply of the anode gas is stopped. This predetermined amount is set by the amount of the unburned fuel gas staying in the fuel cell system 10. For example, the predetermined amount is set in advance in consideration of internal volumes of an anode gas supply passage 22, a reformer 26, the fuel cell stack 1 and the like necessary to calculate the amount of the unburned fuel gas. In the present embodiment, the predetermined amount is set such that a ratio (C/O$_2$) of a molar amount of carbon (C) to a molar amount of oxygen (O$_2$) is larger than 1 and a temperature of the exhaust combustor 40 does not drop below a lower limit temperature necessary to burn the unburned fuel gas.

Alternatively, a map representing a relationship between the amount of fuel injected to an evaporator 24 and the amount of the unburned fuel gas staying in the anode gas supply passage 22 when a stop command signal is received is prepared in advance using experimental data, simulation result or the like, the staying amount of the unburned fuel gas may be obtained by referring to the map when the stop command signal is received and a flow rate of air to be supplied to the exhaust combustor 40 may be set on the basis of the staying amount.

In this way, the anode off-gas discharged to the exhaust combustor 40 can be reliably burned. In addition, since excessive supply of air from a compressor 32 to the exhaust combustor 40 is suppressed, it is possible to avoid a situation where the temperature of the exhaust combustor 40 excessively drops and the unburned fuel gas cannot be burned in the exhaust combustor 40 and reduce power consumption of the compressor 32.

The control unit 6 in the present embodiment supplies the predetermined amount of air to the exhaust combustor 40 via the fuel cell stack 1 by continuing to drive the compressor 32 and opening a cathode flow rate control valve 34. In this way, the shortage of oxygen in the exhaust combustor 40 can be avoided while the fuel cell stack 1 is cooled by the air discharged from the compressor 32.

It should be noted that the control unit 6 may supply air to the exhaust combustor 40 without via the fuel cell stack 1 by closing the cathode flow rate control valve 34 and opening a combustor air control valve 312. Since a temperature drop of the fuel cell stack 1 is suppressed in this way, the fuel cell system 10 can be started promptly even if a restart-up command is issued during a stop control of the fuel cell system 10.

In Step S923, the control unit 6 judges whether or not a forced discharge timing in the stop control has been reached after receiving a stop command signal of the fuel cell system 10. In the present embodiment, the control unit 6 includes a timer for measuring an elapsed time from the stop command, starts timer counting when receiving the stop command signal and judges that the forced discharged timing has been reached when a count value of the timer indicates the elapse of a predetermined time.

The predetermined time mentioned here is a value determined in advance to suppress the oxidation of an anode electrode in a fuel cell and can be determined, for example, using a temperature characteristic of the fuel cell stack 1, a pressure characteristic of the anode gas supply passage 22 or the like after the stop command.

In Step S924, the control unit 6 supplies air as the cathode gas to the anode gas supply passage 22 if it is judged that the forced discharged timing has been reached.

In the present embodiment, the control unit 6 opens an anode system air supply valve 341 if the forced discharge timing has been reached. Since the air discharged from the compressor 32 is supplied to the heat exchanger 25 and the reformer 26 and the pressure in the anode gas supply passage 22 increases in this way, the unburned fuel gas and the like remaining in the reformer 26, the fuel cell stack 1 and the like can be pushed out to the exhaust combustor 40.

For example, the control unit 6 supplies, to the anode gas supply passage 22, air at a flow rate necessary to push out the unburned fuel gas staying inside the reformer 26 to the exhaust combustor 40 if the forced discharged timing has been reached. The control unit 6 closes the anode system air supply valve 341 and stops the driving of the compressor 32 after supplying the air at the predetermined flow rate to the anode gas supply passage 22. In this way, the stop control of the fuel cell system 10 is finished.

When the processing of Step S924 is finished, the procedure of a series of the processings (S910 to S924) relating to a control method for the fuel cell system 10 in the present embodiment is finished. It should be noted that the processings of Steps S922a and S922b may be simultaneously performed or the processing of Step S922b may be performed earlier than the processing of Step S922a.

Figure 4:
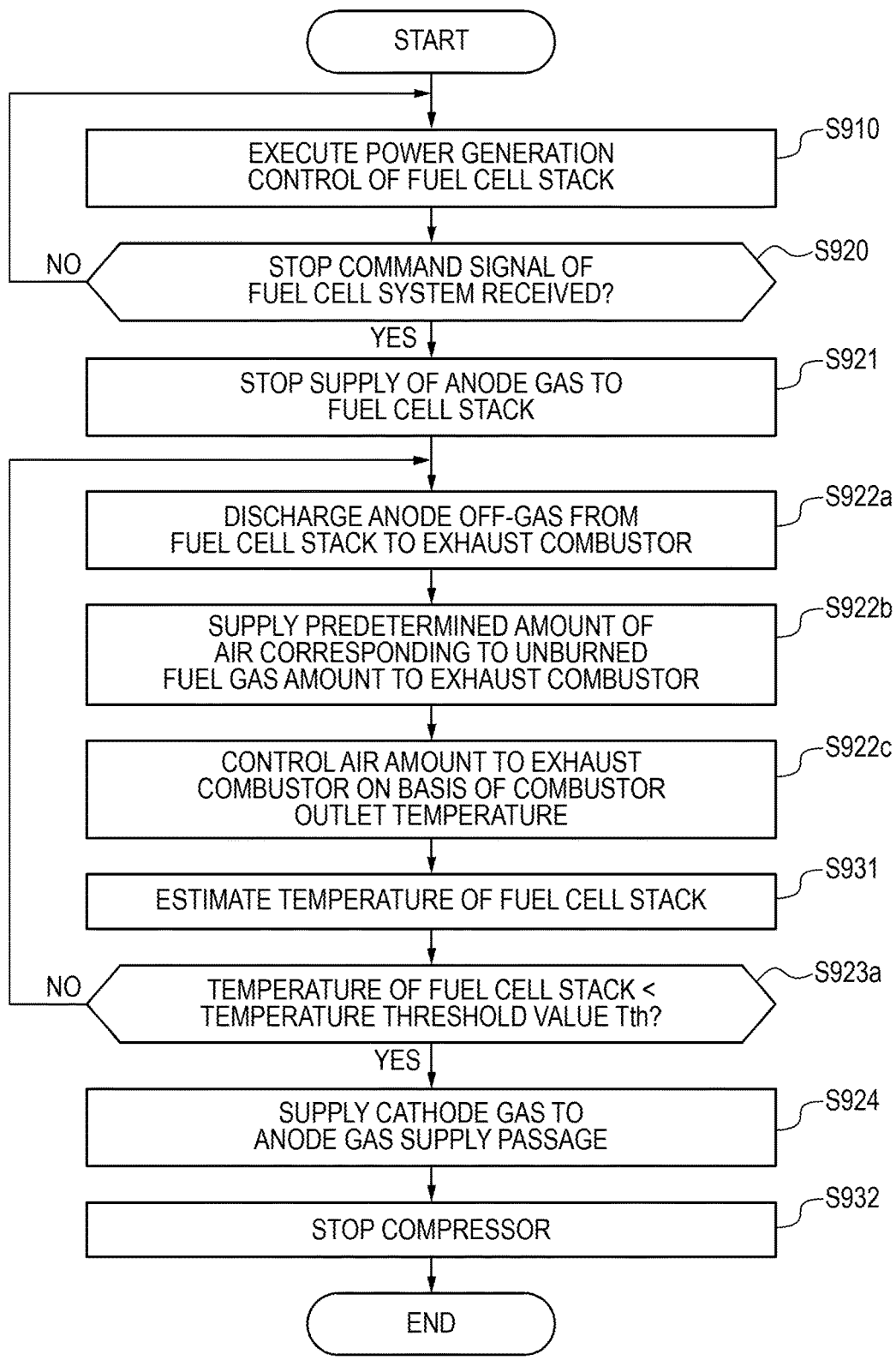
FIG. 4 is a flow chart showing another example of the method for stopping the fuel cell system, FIG. 5 are time charts when oxidant gas is supplied to a fuel passage on the basis of a temperature of a fuel cell when the fuel cell system is stopped.

FIG. 4 is a flow chart showing another example of the process procedure relating to the method for stopping the fuel cell system.

The method for stopping the fuel cell system 10 in FIG. 4 includes a processing of S923a instead of the processing of Step S923 shown in FIG. 3 and additionally includes processings of Steps S922c, S931 and S932. Since the other processings are the same as those shown in FIG. 3, only the processings of Steps S922c, S923a, S931 and S932 are described in detail.

In Step S922c, the control unit 6 controls the flow rate of air to be supplied from the compressor 32 to the exhaust combustor 40 on the basis of a temperature of the discharged gas discharged from the exhaust combustor 40 so that the temperature of the exhaust combustor 40 does not fall below a temperature necessary to burn the unburned fuel gas.

In the present embodiment, the control unit 6 reduces the flow rate of the air set in Step S922b if a combustor outlet temperature detected by a temperature sensor 64 drops to a combustion lower limit temperature. The combustion lower limit temperature mentioned here is a lower limit value of the temperature necessary to burn the unburned fuel gas in the exhaust combustor 40. Alternatively, within a range where the combustor outlet temperature does not drop below the combustion lower limit temperature, the control unit 6 may reduce the flow rate of the air to be supplied to the exhaust combustor 40 as the combustor outlet temperature decreases and increase the flow rate of the air to be supplied to the exhaust combustor 40 as the combustor outlet temperature increases.

As just described, the control unit 6 corrects the flow rate of the air to be supplied to the exhaust combustor 40 according to the temperature of the exhaust combustor 40. In this way, the temperature of the exhaust combustor 40 can be maintained at the temperature necessary to burn the unburned fuel gas.

In Step S931, the control unit 6 obtains a temperature of the fuel cell stack 1. For example, the control unit 6 estimates the temperature of the fuel cell stack 1 using a stack inlet temperature detected by a temperature sensor 62, a stack outlet temperature detected by a temperature sensor 63, a cathode inlet temperature detected by a temperature sensor 66 and a cathode outlet temperature detected by the temperature sensor 67.

In the present embodiment, the control unit 6 estimates the temperature of the fuel cell stack 1 on the basis of the stack inlet temperature detected by the temperature sensor 62 and the stack outlet temperature detected by the temperature sensor 63.

For example, the control unit 6 calculates an average value obtained by dividing the sum of the stack inlet temperature and the stack outlet temperature by 2 as the temperature of the fuel cell stack 1. In this way, whether or not the temperature of the fuel cell stack 1 has dropped to the temperature at which an oxidation reaction is less likely to occur in the anode electrode can be more accurately determined as compared to the case where an average value of the cathode inlet temperature and the cathode outlet temperature is used. It should be noted that a temperature sensor for detecting a temperature of the anode electrode of the fuel cell stack 1 may be provided in the fuel cell stack 1 and a detection value of that temperature sensor may be used.

In Step S923a, the control unit 6 judges whether or not the temperature of the fuel cell stack 1 has dropped below a temperature threshold value Tth determined to suppress the oxidation of the anode electrode in the fuel cell stack 1. The temperature threshold value Tth is, for example, set at 300°.

If the temperature of the fuel cell stack 1 is equal to or higher than the temperature threshold value Tth, the control unit 6 judges that the forced discharge timing has not been reached and returns to the processing of Step S922. The processing of Step S922 is repeatedly performed until the temperature of the fuel cell stack 1 becomes lower than the temperature threshold value Tth.

In Step S924, the control unit 6 judges that the forced discharge timing has been reached and opens the anode system air supply valve 341 if the temperature of the fuel cell stack 1 has become lower than the temperature threshold value Tth. In this way, air is supplied from the compressor 32 to the anode gas supply passage 22 via an oxidation reforming passage 331.

In Step S932, the control unit 6 stops the driving of the compressor 32 when the combustion of the unburned fuel gas in the exhaust combustor 40 is completed, whereby the procedure of a series of processings relating to the method for stopping the fuel cell system 10 is finished.

Figure 5:
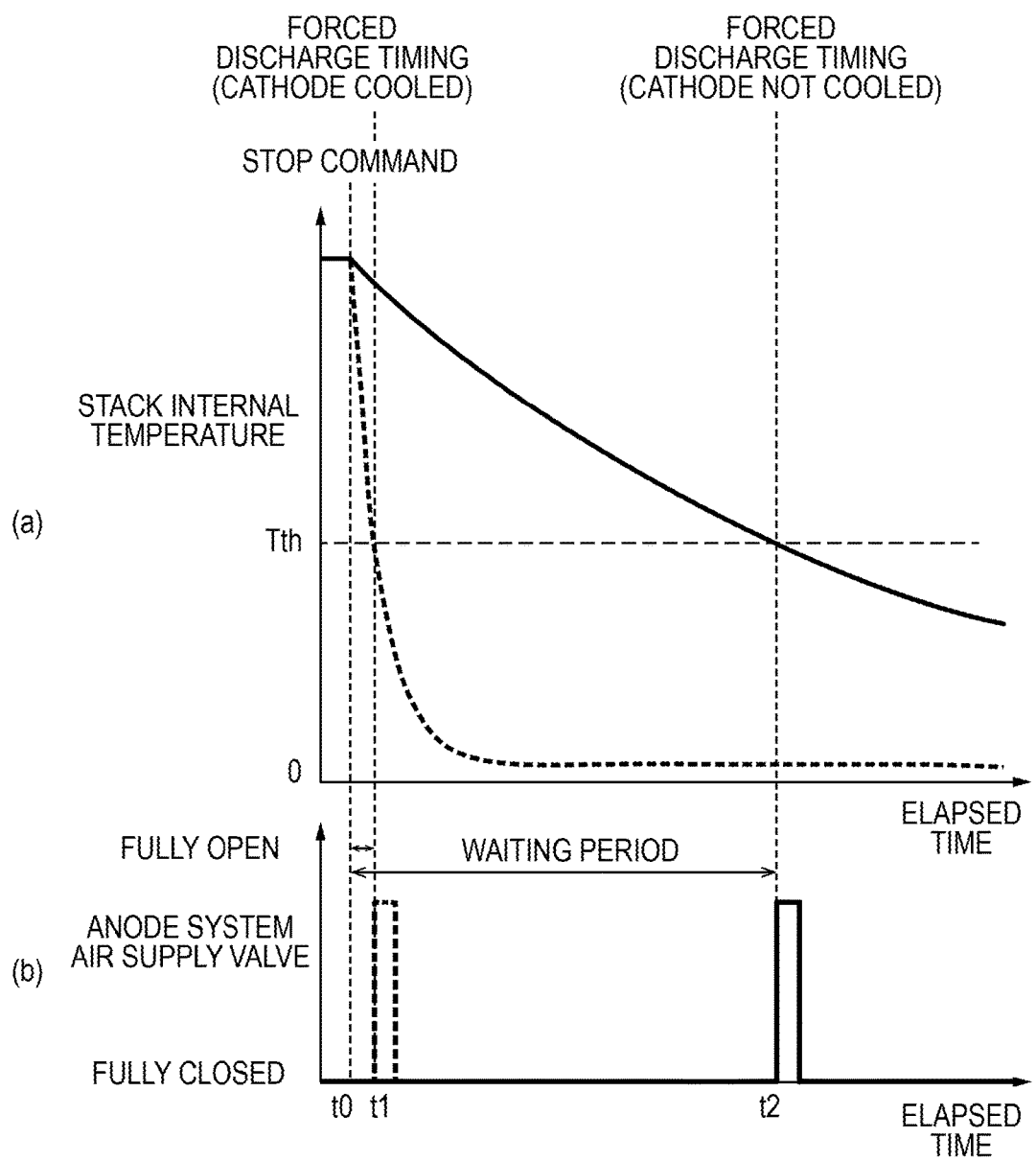

FIG. 5 are charts showing the forced discharge timing in the stop control of the fuel cell system 10.

FIG. 5(a) is a chart showing a change of the internal temperature of the fuel cell stack 1. FIG. 5(b) is a chart showing a change of the opening degree of the anode system air supply valve 341. Horizontal axes of these charts are a time axis common to each other.

In FIGS. 5(a) and 5(b), the forced discharge timing when the air is continuously supplied to a cathode electrode of the fuel cell stack 1 by opening the cathode flow rate control valve 34 in the case of stopping the fuel cell system 10 is shown by dotted line. Further, the forced discharge timing when the supply of the air to the cathode electrode is stopped by closing the cathode flow rate control valve 34 and opening the combustor air control valve 312 is shown by solid line.

At time t0, a stop command signal is transmitted to the control unit 6 by an operation unit 101 and the control unit 6 starts the stop control of stopping the fuel cell system 10 when receiving the stop command signal.

When the supply of air to the cathode electrode of the fuel cell stack 1 is stopped as shown by solid line in FIG. 5(a), the temperature of the fuel cell stack 1 gently decreases. Thus, as shown by solid line in FIG. 5(b), the temperature of the fuel cell stack 1 becomes lower than the temperature threshold value Tth at time t2, wherefore the anode system air supply valve 341 is opened. In this way, the unburned fuel gas staying inside the reformer 26 and the fuel cell stack 1 can be burned in the exhaust combustor 40 while the oxidation of the anode electrode in the fuel cell stack 1 is suppressed.

On the other hand, as shown by dotted line in FIG. 5(a), the inside of the fuel cell stack 1 is cooled by the air supplied to the cathode electrode of the fuel cell stack 1 if the supply of the air to the cathode electrode of the fuel cell stack 1 is continued. Thus, the temperature of the fuel cell stack 1 decreases promptly.

It should be noted that a heater may be arranged around the exhaust combustor 40 to warm the exhaust combustor 40 so that the temperature of the exhaust combustor 40 does not excessively decrease in the case of cooling by supplying the air to the cathode electrode of the fuel cell stack 1. Alternatively, a passage branched from a cathode gas discharge passage 39 and bypassing the exhaust combustor 40 may be provided and part of the air discharged from the cathode side of the fuel cell stack 1 may be discharged without via the exhaust combustor 40.

At time t1, the temperature of the fuel cell stack 1 drops below the temperature threshold value Tth and the anode system air supply valve 314 is opened as shown by dotted line in FIG. 5(b). In this way, the unburned fuel gas staying in the anode gas supply passage 22 is pushed out by the air supplied from the anode system air supply valve 341, wherefore the pushed-out unburned fuel gas is burned in the exhaust combustor 40. Thus, the discharge of the unburned fuel gas at the time of the next start-up control can be suppressed while s stop control time until the stop control of the fuel cell system 10 is completed is shortened.

As described above, the unburned fuel gas staying in the reformer 26 and the fuel cell stack 1 can be burned in the exhaust combustor 40 by forcibly supplying the cathode gas from the compressor 32 to the anode gas supply passage 22 in the case of stopping the fuel cell system 10. Thus, a discharge amount of the unburned fuel gas from the exhaust passage 41 to the atmosphere when the fuel cell system 10 is started next time can be reduced.

It should be noted that although the air is supplied to the anode gas supply passage 22 through the oxidation reforming passage 331 in the present embodiment, there is no limitation to this. For example, the fuel cell system 10 may be provided with an air supply passage branched from a cathode gas supply passage 33 between a heating device 35 and the fuel cell stack 1 and joining the anode gas supply passage 22 between the heat exchanger 25 and the reformer 26, and air may be supplied to the anode gas supply passage 22 by opening an on-off valve provided in this air supply passage when the forced discharge timing is reached.

Further, although air is supplied to the anode gas supply passage 22 at the forced discharge liming utilizing the compressor 32 in the present embodiment, there is no limitation to this. For example, the fuel cell system 10 may be additionally provided with an air supplier different from the compressor 32 and air may be supplied to the anode gas supply passage 22 using this air supplier when the forced discharge timing is reached.

Figure 6:
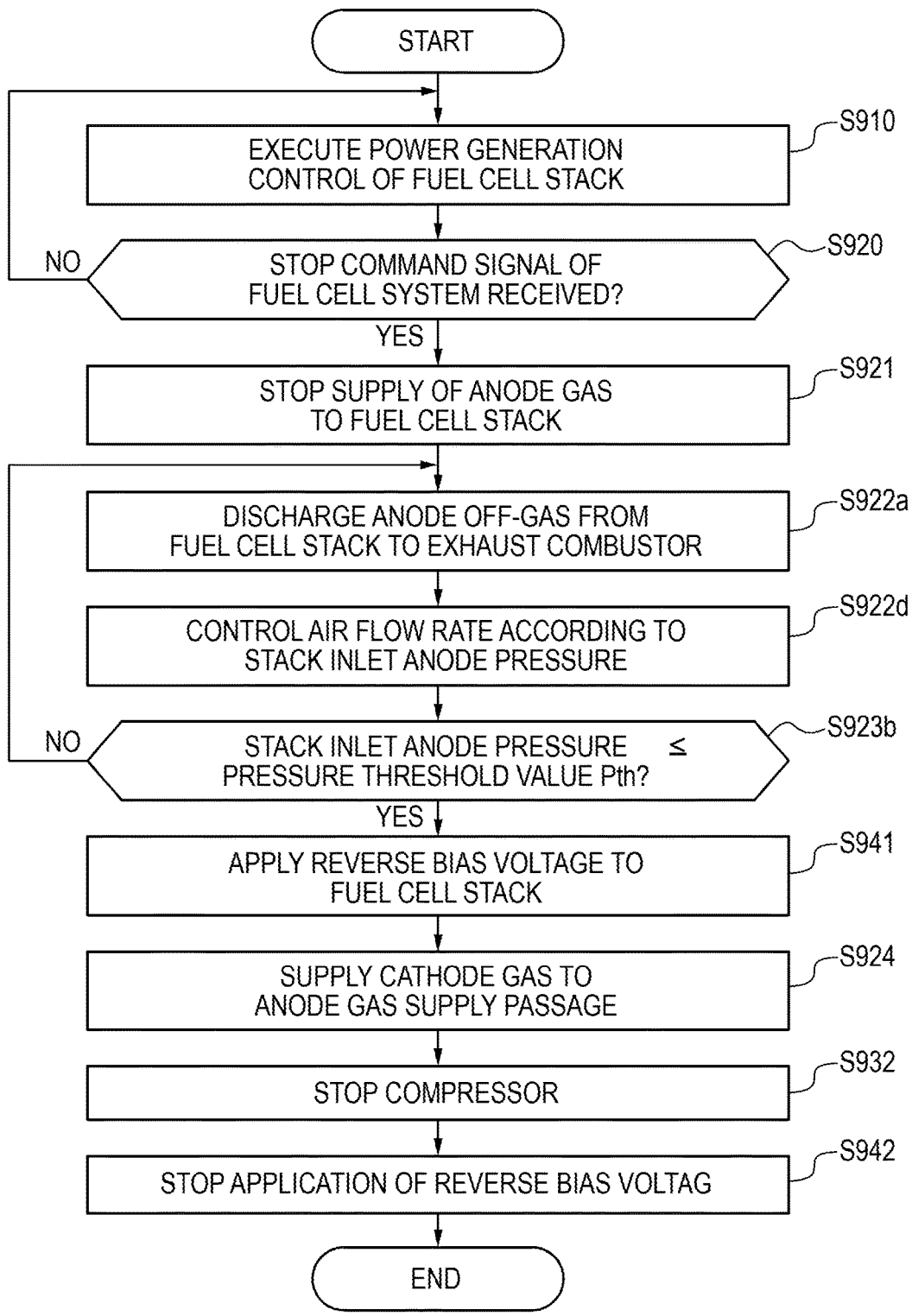
FIG. 6 is a flow chart showing another example of the method for stopping the fuel cell system, FIG. 7 are time charts when the oxidant gas is supplied to the fuel passage on the basis of a pressure in the fuel passage when the fuel cell system is stopped.

FIG. 6 is a flow chart showing another example of the process procedure relating to the method for stopping the fuel cell 10.

The stopping method in FIG. 6 includes Steps S922d and S923b instead of Steps S922b and S923 shown in FIG. 3 and additionally includes Steps S941 and S942. Since the other processings are the same as those shown in FIG. 3, only processings of Steps S922d, S923b, S941 and S942 are described in detail.

In Step S922d, the control unit 6 controls the flow rate of air to be supplied from the compressor 32 to the exhaust combustor 40 according to a pressure in the anode gas supply passage 22.

In the present embodiment, the control unit 6 obtains a stack inlet anode pressure from a pressure sensor 61 and calculates a flow rate of the unburned fuel gas discharged to the exhaust combustor 40 using a predetermined map or calculation formula on the basis of the stack inlet anode pressure. The control unit 6 supplies air at a flow rate corresponding to the calculated flow rate of the unburned fuel gas to the exhaust combustor 40. Specifically, the control unit 6 reduces the flow rate of the air discharged from the fuel cell stack 1 to the exhaust combustor 40 according to a change of the stack inlet anode pressure. For example, the control unit 6 decreases the opening degree of the cathode flow rate control valve 34 as the stack inlet anode pressure decreases. In this way, the flow rate of air to be discharged to the exhaust combustor 40 through the fuel cell stack 1 can be reduced.

In the case of stopping the supply of the anode gas, a flow rate of the anode off-gas flowing into the exhaust combustor 40 changes according to a pressure difference between the stack inlet anode pressure and a combustor outlet pressure. Thus, the air flow rate necessary to burn the unburned fuel gas in the exhaust combustor 40 can be set on the basis of the stack inlet anode pressure. Therefore, the control unit 6 can control the air flow rate to the exhaust combustor 40 on the basis of the stack inlet anode pressure using a map representing a relationship between the stack inlet anode pressure and the air flow rate necessary for combustion in the exhaust combustor 40. Alternatively, the control unit 6 may obtain the combustor outlet pressure from a pressure sensor 65 and control the flow rate of air discharged from the fuel cell stack 1 to the exhaust combustor 40 on the basis of the pressure difference between the stack inlet anode pressure and the combustor outlet pressure.

In Step S923b, the control unit 6 obtains the stack inlet anode pressure from the pressure sensor 61 and judges whether or not the stack inlet anode pressure has dropped to a predetermined pressure threshold value Pth. The pressure threshold value Pth mentioned here is set on the basis of a pressure value minimum necessary to discharge the gas staying inside the reformer 26 to the exhaust combustor 40. In the present embodiment, the pressure threshold value Pth is set at the combustor outlet pressure detected by the pressure sensor 65 or a value obtained by adding a fixed value taking into account an error and the like to the combustor outlet pressure.

If the stack inlet anode pressure is higher than the pressure threshold value Pth, the unburned fuel gas staying in the reformer 26 is discharged to the exhaust combustor 40. Thus, the control unit 6 judges that the forced discharge timing has not been reached and returns to the processing of Step S922*a*. The processing of Step S922*a* is repeatedly performed until the stack inlet anode pressure decreases to the pressure threshold value Pth.

In Step S941, the control unit 6 applies a reverse bias voltage to the fuel cell stack 1 by controlling a DC/DC converter 51 if the stack inlet anode pressure is equal to or lower than the pressure threshold value Pth. Specifically, the control unit 6 applies a potential higher than a potential applied to a positive electrode terminal of the fuel cell stack 1 to a negative electrode terminal of the fuel cell stack 1. In this way, the oxidation of the anode electrode can be suppressed even if oxygen is supplied to the anode gas flow passage of the fuel cell stack 1.

Thereafter, air is forcibly supplied to the anode gas supply passage 22 in Step S924, whereby the unburned fuel gas remaining inside the reformer 26, the fuel cell stack 1 and the like can be pushed out to the exhaust combustor 40. Thereafter, the driving of the compressor 32 is stopped in Step S923. It should be noted that the control unit 6 may supply air from the compressor 32 to the fuel cell stack 1 until the temperature of the fuel cell stack 1 reaches the temperature threshold value Tth and stop the driving of the compressor 32 when the temperature of the fuel cell stack 1 drops below the temperature threshold value Tth.

In Step S942, the control unit 6 stops applying the reverse bias voltage to the fuel cell stack 1 and stops the driving of the DC/DC converter 51.

As just described, the driving of the compressor 32 can be suppressed while the oxidation of the anode electrode is suppressed by stopping the supply of air to the anode gas supply passage 22 until the stack inlet anode pressure reaches the pressure threshold value Pth after the reception of the stop command signal. Thus, power consumption of the compressor 32 can be reduced while a reduction of power generation performance of the fuel cell stack 1 is suppressed. Further, since an application time of the reverse bias voltage to the fuel cell stack 1 can be shortened, power necessary to drive the DC/DC converter 51 can be reduced.

It should be noted that although the reverse bias voltage is applied to the fuel cell stack 1 if the stack inlet anode pressure is lower than the pressure threshold value Pth in Step S923*a* of the present embodiment, there is no limitation to this. For example, the reverse bias voltage may be applied to the fuel cell stack 1 immediately after the stop command signal is received in Step S920. In this way, the oxidation of the anode electrode of the fuel cell stack 1 when the fuel cell system 10 is stopped can be more reliably suppressed.

Further, the control unit 6 may simultaneously perform the processings of Steps S922*a* and S922*d* or may perform the processing of Step S922*d* earlier than the processing of Step S922*a*. Further, instead of the processing of Step S922*d*, the control unit 6 may perform the processing of Step S922*b* shown in FIG. 3 or may perform the processings of Steps S922*b* and S922*c* shown in FIG. 4.

Figure 7:
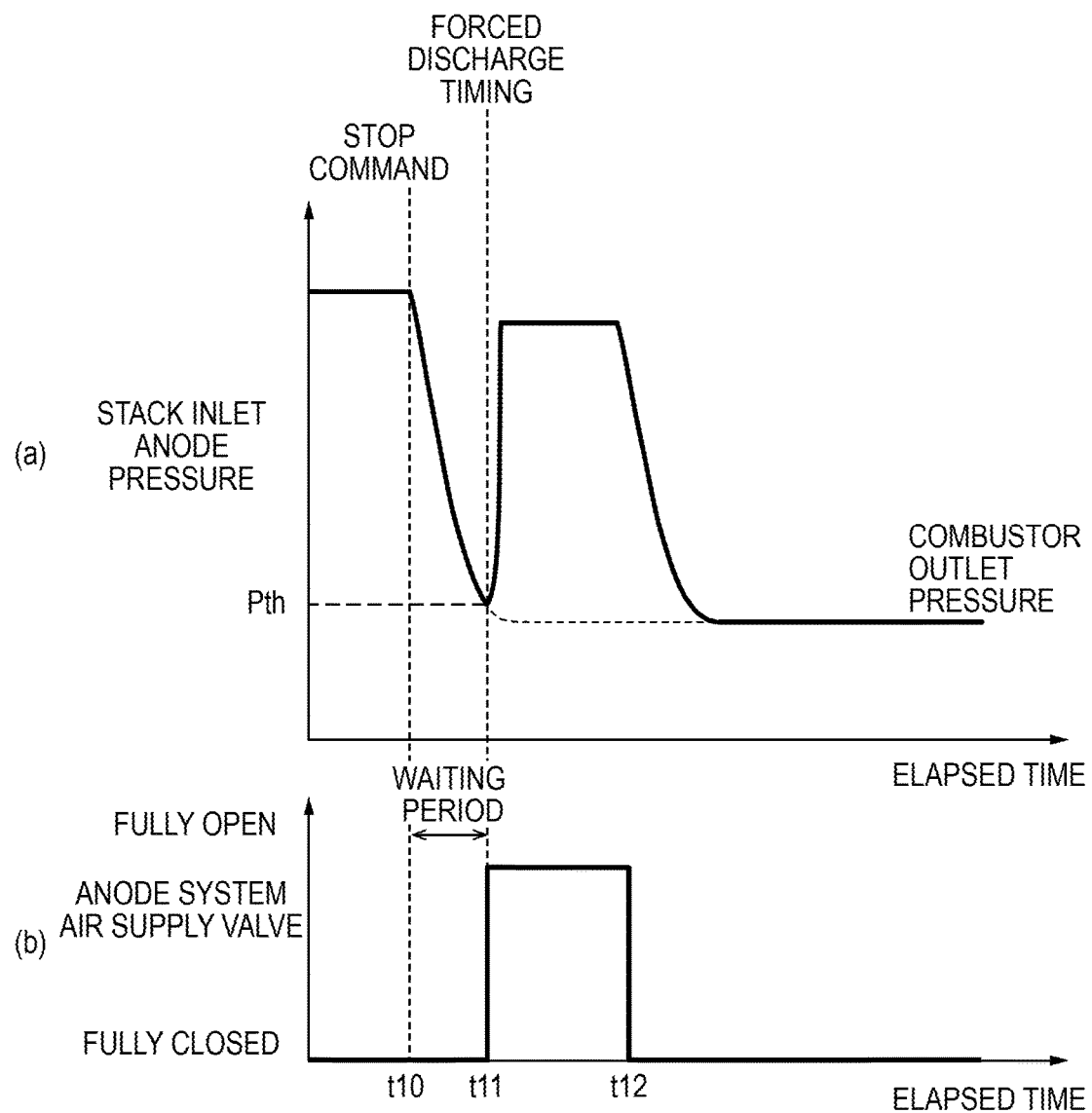

FIG. 7 are charts showing the forced discharge timing in the stop control of the fuel cell system 10 shown in FIG. 6.

FIG. 7(*a*) is a chart showing a change of the pressure of the anode gas to be supplied to the fuel cell stack 1 (stack inlet anode pressure). FIG. 7(*b*) is a chart showing a change of the opening degree of the anode system air supply valve 341. Horizontal axes of these charts are a time axis common to each other.

In FIG. 7(*a*), the stack inlet anode pressure when the anode system air supply valve 341 is opened after the stop command of the fuel cell system 10 is shown by solid line and the stack inlet anode pressure in a state where the anode system air supply valve 341 is kept open is shown by dotted line.

At time t10, a stop command signal is fed to the control unit 6 by the operation unit 101. The control unit 6 executes the stop control of the fuel cell system 10 when receiving this stop command signal.

In the stop control, the control unit 6 supplies air at a flow rate corresponding to the amount of the unburned fuel gas to the exhaust combustor 40 via the fuel cell stack 1 by continuing to drive the compressor 32 and opening the cathode flow rate control valve 34. Further, the control unit 6 stops the driving of the pump 21 and closes the fuel supply valve 23. In this way, the supply of the anode gas to the fuel cell stack 1 is stopped, wherefore the pressure in the anode gas supply passage 22 (stack inlet anode pressure) decreases.

In a state where the stack inlet anode pressure is higher than the pressure in the exhaust combustor 40 (combustor outlet pressure), the unburned fuel gas corresponding to the stack inlet anode pressure flows from the reformer 26 toward the exhaust combustor 40. Thus, the unburned fuel gas is discharged as the anode off-gas to the exhaust combustor 40 through the fuel cell stack 1. Thus, the unburned fuel gas staying after the supply of the anode gas is stopped can be burned in the exhaust combustor 40.

At time t11, the stack inlet anode pressure decreases to the pressure threshold value Pth as shown in FIG. 7(*a*). Along with this, the pressure difference between the stack inlet anode pressure and the combustor outlet pressure becomes smaller. Thus, the discharge amount of the anode off-gas from the fuel cell stack 1 to the exhaust combustor 40 decreases. Therefore, the reverse bias voltage is applied to the fuel cell stack 1 by the DC/DC converter 51 and the anode system air supply valve 341 is fully opened or set to a predetermined opening degree as shown in FIG. 7(*b*).

In this way, air is supplied from the compressor 32 to the anode gas supply passage 22 to increase the stack inlet anode pressure and the unburned fuel gas remaining in the anode gas supply passage 22 is pushed out to the exhaust combustor 40. Thus, the unburned fuel gas remaining in the reformer 26 can be reliably burned in the exhaust combustor 40 and discharged to the outside air.

During a period from time t10 to time t11, the discharge amount of the anode off-gas from the fuel cell stack 1 to the exhaust combustor 40 gradually decreases with time similarly to a time characteristic of the stack inlet anode pressure shown in FIG. 7(*a*) by controlling the compressor 32 and the cathode flow rate control valve 34. Thus, the control unit 6 gradually reduces the flow rate of air to be supplied to the exhaust combustor 40 similarly to the time characteristic shown in FIG. 7(*a*). In this way, excessive air supply to the exhaust combustor 40 can be suppressed, wherefore it is possible to suppress power consumption of the compressor 32 and suppress a temperature drop of the exhaust combustor 40.

Since a predetermined amount of air is supplied from the anode system air supply valve 341 to the anode gas supply passage 22 at time t12, most of the unburned fuel gas remaining in the anode gas supply passage 22 is discharged to the exhaust combustor 40 and burned. Thus, the anode system air supply valve 341 is closed as shown in FIG. 7(*b*).

Thereafter, if the temperature of the fuel cell stack 1 drops to the temperature threshold value Tth, the driving of the compressor 32 is stopped, the application of the reverse bias voltage to the fuel cell stack 1 is stopped and the stop control of the fuel cell system 10 is finished.

It should be noted that although whether or not the fuel cell system 10 has reached the forced discharge timing is judged on the basis of the stack inlet anode pressure in this example, whether or not the forced discharge timing has been reached may be judged on the basis of the pressure difference between the stack inlet anode pressure and the combustor outlet pressure.

According to the second embodiment of the present invention, the control unit 6 supplies air serving as the oxidant gas to the anode gas supply passage (fuel passage) 22 in the case of stopping the fuel cell system 10. Since the unburned fuel gas staying in the anode gas supply passage 22 and the fuel cell stack 1 can be reliably pushed out as the anode off-gas from the fuel cell stack 1 in this way, the unburned fuel gas staying in the anode gas supply passage 22 can be burned in the exhaust combustor 40.

Further, according to the second embodiment, a fuel supplying system 2 includes the reformer 26 for reforming the fuel gas heated by the exhaust combustor 40, and an oxidant supplying system 3 includes the oxidation reforming passage 331 as a branch passage branched from the cathode gas supply passage (oxidant passage) 33 and joining the anode gas supply passage 22 at a position upstream of the reformer 26. The control unit 6 supplies air from the oxidation reforming passage 331 to the anode gas supply passage 22 using the compressor 32 in the case of stopping the fuel cell system 10.

In this way, the unburned fuel gas staying inside the reformer 26 can be burned in the exhaust combustor 40. Since a large amount of the unburned fuel gas stays inside the reformer 26 provided in the anode gas supply passage 22, more unburned fuel gas can be burned in the exhaust combustor 40 by supplying air from a side upstream of the reformer 26. Thus, the discharge amount of the unburned fuel gas during the next start-up can be further reduced.

Further, according to the present embodiment, the oxidation reforming passage 331 is a branch passage for supplying air instead of stream used in a reforming reaction, and the oxidant supplying system 3 further includes the anode system air supply valve (control valve) 341 provided in the oxidation reforming passage 331 and configured to control the flow rate of air to be supplied to the reformer 26. The control unit 6 opens the anode system air supply valve 341 after the elapse of a predetermined waiting period following the stop of power generation of the fuel cell stack 1 by stopping the supply of the anode gas, i.e. when the forced discharge timing is reached in the case of receiving the stop command signal of the fuel cell system 10.

As just described, since the temperature of the fuel cell stack 1 decreases to a certain extent by waiting to supply air to the anode electrode for the predetermined waiting period after the stop command, a progress of the oxidation reaction of the anode electrode associated with the supply of air to the anode gas supply passage 22 can be suppressed. Further, by waiting for the predetermined waiting period, the unburned fuel gas is discharged utilizing the pressure difference between the stack inlet anode pressure and the combustor outlet pressure during this period. Thus, air needs not be supplied to the anode gas supply passage 22. Therefore, a total amount of air to be supplied to the anode gas supply passage 22 can be reduced and the oxidation of the anode electrode can be suppressed.

The aforementioned waiting period is, for example, determined on the basis of the temperature of the fuel cell stack 1. In this way, air can be supplied to the anode gas supply passage 22 when the temperature of the fuel cell stack 1 drops to the temperature at which the occurrence of the oxidation reaction of the anode electrode can be suppressed. Thus, the unburned fuel gas staying in the anode gas supply passage 22 can be reliably burned while the oxidation of the anode electrode is suppressed. It should be noted that the waiting period may be obtained considering a time characteristic of the stack temperature in relation to the supply amount of the cathode gas to the fuel cell stack 1 in the stop control, e.g. the characteristic shown in FIG. 5(*a*) by an experiment or the like. Alternatively, mapping of a waiting time for each supply amount of the cathode gas may be stored in a computer and the waiting time may be called up according to the supplied state of the cathode gas at the time of the stop command.

Alternatively, the aforementioned waiting period may be determined on the basis of the anode gas pressure of the fuel cell stack 1. In this way, air can be supplied to the anode gas supply passage 22 when the discharge of the unburned fuel gas from the fuel cell stack 1 to the exhaust combustor 40 is stopped. Thus, it is possible to shorten a time required for the stop control and reliably burn the unburned fuel gas staying in the anode gas supply passage 22. It should be noted that the waiting period may be obtained considering a time characteristic relating to the pressure in the anode gas supply passage 22 after the supply of the anode gas is stopped, e.g. the characteristic shown in FIG. 7(*a*) by an experiment or the like. Alternatively, mapping of a waiting time for each stack inlet anode pressure at the time of the stop command may be stored in the computer and the waiting time may be called up according to the pressure state of the anode gas supply passage 22 at the time of the stop command.

Further, according to the present embodiment, the control unit 6 applies the reverse bias voltage (counter electromotive force) from the DC/DC converter 51 outside to the fuel cell stack 1 and supplies air to the anode gas supply passage 22 after the elapse of the waiting period from the stop of the fuel cell stack 1 in the case of stopping the fuel cell system 10.

In this way, the unburned fuel gas remaining in the anode gas supply passage 22 can be discharged to the exhaust combustor 40 while the oxidation of the anode electrode due to the supply of air to the anode gas supply passage 22 is suppressed. Thus, the discharge of the unburned fuel gas from the fuel cell system 10 to the outside air can be suppressed while a reduction of power generation performance of the fuel cell stack 1 is suppressed.

It should be noted that although an example of applying the reverse bias voltage from the DC/DC converter 51 to the fuel cell stack 1 has been described in the present embodiment, an electrical circuit different from the DC/DC converter 51 may be provided in the fuel cell stack 1 and the reverse bias voltage may be applied to the fuel cell stack 1 by that electrical circuit.

Further, according to the present embodiment, the control unit 6 opens the anode system air supply valve 341 when at least one parameter, out of the stack inlet anode pressure, the temperature of the fuel cell stack 1 and the elapsed time after the stop command exceeds the predetermined threshold value.

For example, the control unit 6 calculates the temperature of the anode electrode in the fuel cell stack 1 on the basis of the stack inlet temperature serving as the temperature of the anode gas to be supplied to the fuel cell stack 1 and the stack outlet temperature serving as the temperature of the anode off-gas discharged from the fuel cell stack 1. Then, the control unit 6 opens the anode system air supply valve 341 and supplies air to the anode gas supply passage 22 if the temperature of the fuel cell stack 1 drops below the temperature threshold value Tth determined to suppress the oxidation of the fuel cell stack 1 as shown in FIG. 5(*a*). As just described, since air is supplied to the anode gas supply passage 22 in a state where the oxidation reaction of the anode electrode of the fuel cell stack 1 is less likely to occur, the deterioration of the fuel cell stack 1 can be suppressed.

Alternatively, the control unit 6 opens the anode system air supply valve 341 when the stack inlet anode pressure drops below the predetermined pressure threshold value Pth as shown in FIG. 7(*a*). In this way, since the unburned fuel gas is discharged to the exhaust combustor 40 due to the pressure difference between the stack inlet anode pressure and the combustor outlet pressure even if air is not supplied to the anode gas supply passage 22, the supply amount of air to the anode gas supply passage 22 can be reduced. Therefore, the oxidation of the anode electrode in the fuel cell stack 1 can be suppressed.

Alternatively, the control unit 6 includes the timer for measuring time, a time required for the temperature of the fuel cell stack 1 to reach the temperature threshold value Tth or a time required for the stack inlet anode pressure to reach the pressure threshold value Pth after the stop command is stored in advance, the timer counting is started when the stop command signal is received, and the anode system air supply valve 341 is kept closed until a count value indicates the elapse of the time stored in advance. Since a flow rate of oxygen to be supplied to the anode gas supply passage 22 can be reduced in a state where the temperature of the fuel cell stack 1 is high in this way, the oxidation reaction of the anode electrode in the fuel cell stack 1 can be suppressed by a simple configuration.

As just described, the control unit 6 opens the anode system air supply valve 341 when at least one parameter, out of the pressure in the anode gas supply passage 22, the temperature of the fuel cell stack 1 and the elapsed time after the stop command exceeds the predetermined threshold value. In this way, the supply of air to the anode gas supply passage 22 more than necessary can be suppressed and the deterioration of the fuel cell stack 1 can be suppressed.

Further, according to the present embodiment, the control unit 6 closes the anode system air supply valve 341 and continues to drive the compressor 32 to supply air to the cathode gas supply passage 33 until the predetermined period elapses after the stop command is received.

Since air flows into the fuel cell stack 1 in this way, the fuel cell stack 1 can be cooled. In addition to this, since air is supplied to the exhaust combustor 40 via the fuel cell stack 1, the unburned fuel gas can be appropriately burned in the exhaust combustor 40. Specifically, the stop control of the fuel cell system 10 can be completed promptly and the unburned fuel gas staying in the fuel cell system 10 can be reliably burned.

Alternatively, the oxidant supplying system 3 includes a reforming temperature control air passage 311 as a bypass passage branched from the oxidant passage and joining the cathode gas discharge passage 39 of the fuel cell stack 1 via the exhaust combustor 40. The control unit 6 supplies air to the exhaust combustor 40 through the reforming temperature control air passage 311 by opening the combustor air control valve 312 only for a predetermined period after the stop command. In this way, a situation where oxygen used to burn the unburned fuel gas in the exhaust combustor 40 is lacking can be avoided.

Further, according to the present embodiment, the control unit 6 supplies air only at the predetermined flow rate to the exhaust combustor 40 in the case of stopping the fuel cell system 10. Since excessive supply of air to the exhaust combustor 40 using the compressor 32 can be suppressed in this way, power consumption of the compressor 32 can be reduced.

Further, according to the present embodiment, the fuel cell system 10 includes the temperature sensor 64 for detecting the temperature of the discharged gas discharged from the exhaust combustor 40 (combustor outlet temperature), and the control unit 6 reduces the flow rate of air to be supplied to the exhaust combustor 40 on the basis of the combustor outlet temperature detected by the temperature sensor 64.

For example, the control unit 6 reduces the flow rate of air to be supplied to the exhaust combustor 40 if the combustor outlet temperature drops below the predetermined combustion lower limit temperature. In this way, a temperature drop of the exhaust combustor 40 due to difficulty to cool the exhaust combustor 40 with air can be suppressed while the unburned fuel gas remaining in the fuel cell system 10 is burned after the supply of the anode gas to the fuel cell stack 1 is stopped.

Further, since the flow rate of the unburned fuel gas discharged from the fuel cell stack 1 to the exhaust combustor 40 is gradually reduced, the control unit 6 gradually reduces the flow rate of air to be supplied from the compressor 32 to the exhaust combustor 40 in the case of stopping the fuel cell system 10. In this way, power consumption of the compressor 32 can be reduced while the shortage of oxygen in the exhaust combustor 40 at the time of the stop control is avoided.

Further, according to the present embodiment, the fuel cell system 10 includes the pressure sensor 61 for detecting the pressure of the anode gas to be supplied to the fuel cell stack 1 (stack inlet anode pressure) and the pressure sensor 65 for detecting the pressure of the discharged gas discharged from the exhaust combustor 40 (combustor outlet pressure). The control unit 6 reduces the flow rate of air to be supplied to the exhaust combustor 40 on the basis of the pressure difference between the combustor outlet pressure and the stack inlet anode pressure or only the stack inlet anode pressure. Since the air flow rate is more precisely adjusted in accordance with the flow rate of the unburned fuel gas to be supplied to the exhaust combustor 40 in this way, power consumption of the compressor 32 can be further reduced.

Further, according to the present embodiment, the fuel cell system 10 includes the DC/DC converter 51 as a power controller connected to the fuel cell stack 1 and configured to extract power of the fuel cell stack 1 and supply the power to a battery 52. The control unit 6 applies a counter electromotive force from the DC/DC converter 51 to the fuel cell stack 1 in the case of stopping the fuel cell system 10. Specifically, the control unit 6 applies a potential higher than a potential applied to the positive electrode terminal of the fuel cell stack 1 to the negative electrode terminal of the fuel cell stack 1 by switching-controlling the DC/DC converter 51 in the stop control.

In this way, even if air flows into the anode electrode of the fuel cell stack 1 by supplying air to the anode gas supply passage 22 after the stop command, it can be suppressed that the anode electrode is oxidized by that air. Thus, the unburned fuel gas staying in the system can be burned and discharged to the atmosphere while the oxidation of the anode electrode in the fuel cell stack 1 is suppressed when the fuel cell system 10 is stopped. Thus, the deterioration of the fuel cell stack 1 can be suppressed while the discharge amount of the unburned fuel gas when the fuel cell system 10 is started next time is reduced.

Third Embodiment

Figure 8:
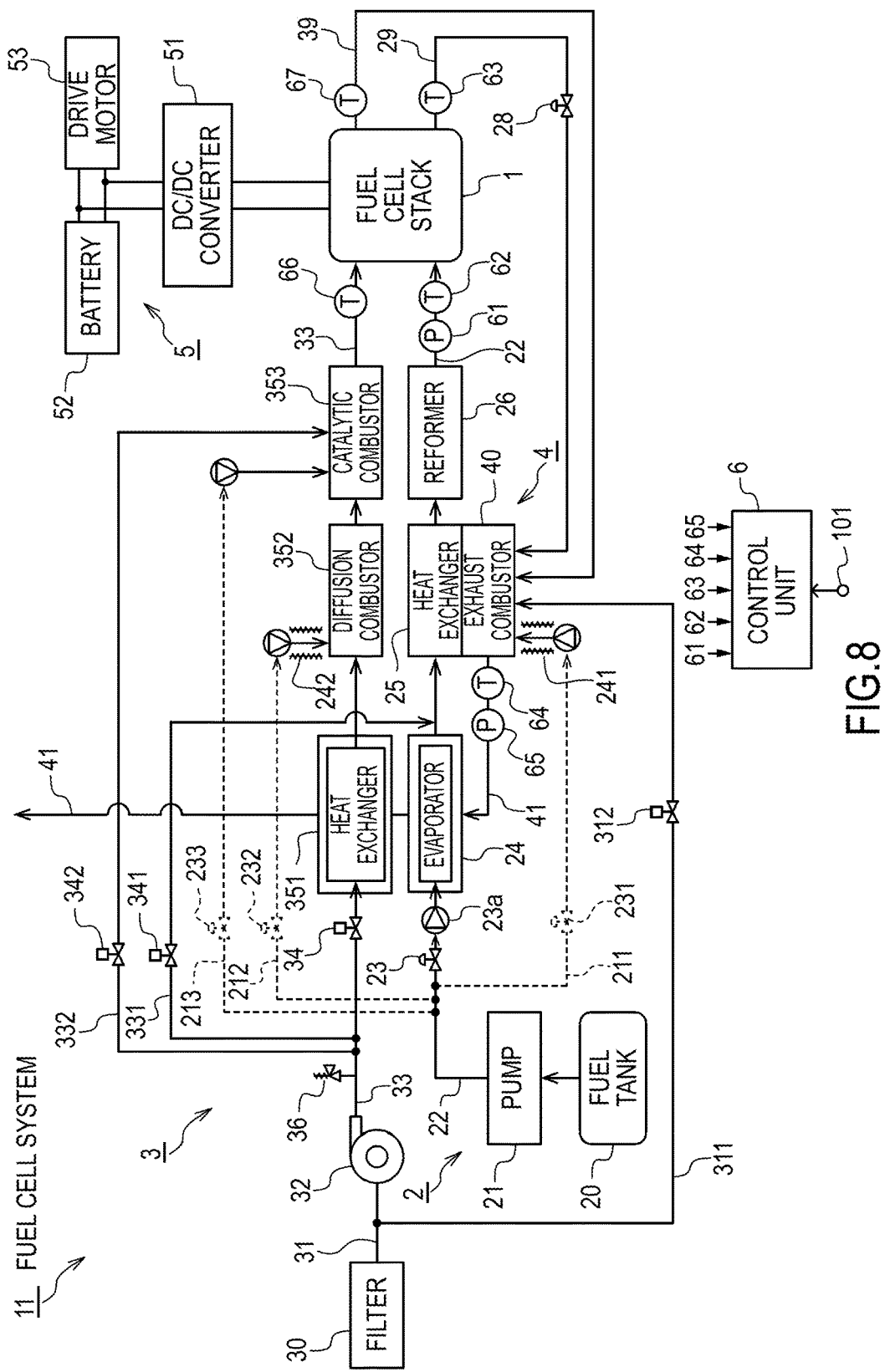
FIG. 8 is a block diagram showing a main configuration of a fuel cell system in a third embodiment of the present invention.

FIG. 8 is a diagram showing an example of the configuration of a fuel cell system 11 in a third embodiment of the present invention.

The fuel cell system 11 includes a heat exchanger 351, a diffusion combustor 352 and a catalytic combustor 353 instead of the heating device 35 of the fuel cell system 10 shown in FIG. 1. Further, the fuel cell system 11 includes a branch passage 332 for passing air from a compressor 32 to a catalytic combustor 353 and branch passages 211, 212 and 213 for passing fuel gas from a pump 21 to each of the exhaust combustor 40, the diffusion combustor 352 and the catalytic combustor 353. Control valves 342, 231, 232 and 232 are respectively provided in the branch passages 332, 211, 212 and 213.

Further, a shut-off valve 28 is mounted in an anode gas discharge passage 29. The shut-off valve 28 is closed after a stop control of the fuel cell system 11 is finished. In this way, a back flow of cathode off-gas and the like in the anode gas discharge passage 29 is prevented to suppress anode deterioration.

A relief valve 36 is mounted in a cathode gas supply passage 33. If a pressure in the cathode gas supply passage 33 exceeds a certain value, the cathode gas supply passage 33 is opened so that a specific load or higher is not applied to the compressor 32.

The control valve 342 supplies a fixed amount of air to the catalytic combustor 353 when a fuel cell stack 1 is started and closes the branch passage 332 after the end of the start-up.

The heat exchanger 351 heats air for fuel gas or air for cathode gas, utilizing heat of discharged gas discharged from the exhaust combustor 40.

The diffusion combustor 352 mixes air heated by the heat exchanger 351 at the start-up of the fuel cell system 10 and heating fuel supplied from the branch passage 212 and heated by an electric heater 242 supplied thereto. A mixture of the air and the heating fuel is ignited by an ignition device belonging to the diffusion combustor 352 to form a preheating burner for the catalytic combustor 353. After the end of the start-up, the air supplied from the heat exchanger 351 is supplied to the catalytic combustor 353.

The catalytic combustor 353 generates high-temperature combustion gas using a catalyst and the preheating burner during the start-up. In the catalytic combustor 353, the air for combustion gas is supplied via the branch passage 332 and the heating fuel is supplied from the branch passage 213, and the both are mixed in a state in contact with the catalyst. By igniting the mixture of the air and the heating fuel by the preheating burner, a large amount of combustion gas is generated. This combustion gas contains no oxygen and mainly contains inert gas. Then, the combustion gas is supplied to a cathode electrode of the fuel cell stack 1 to heat the fuel cell stack 1. It should be noted that, after the end of the start-up, the generation of the combustion gas is finished and the air having passed through the heat exchanger 351 and the diffusion combustor 352 is supplied as cathode gas to the fuel cell stack 1.

The control valves 231, 232 and 233 respectively open the branch passages 211, 212 and 213 at the start-up of the fuel cell system 10 to cause the heating fuel to flow, and respectively close the branch passages 211, 212 and 213 at the end of the start-up. Further, a fuel supply valve 23 closes an anode gas supply passage 22 during the start-up, but opens the anode gas supply passage 22 to cause reforming fuel to flow at the end of the start-up.

At the start-up of the fuel cell system 10, the heating fuel supplied from the branch passage 211 and heated by the electric heater 241 is supplied to the exhaust combustor 40, and the combustion gas passed through the fuel cell stack 1 and the air introduced from a reforming temperature control air passage 311 are mixed to heat the exhaust combustor 40 by a catalytic reaction.

Next, the operation of the fuel cell system 11 in the present embodiment is briefly described.

Figure 9:
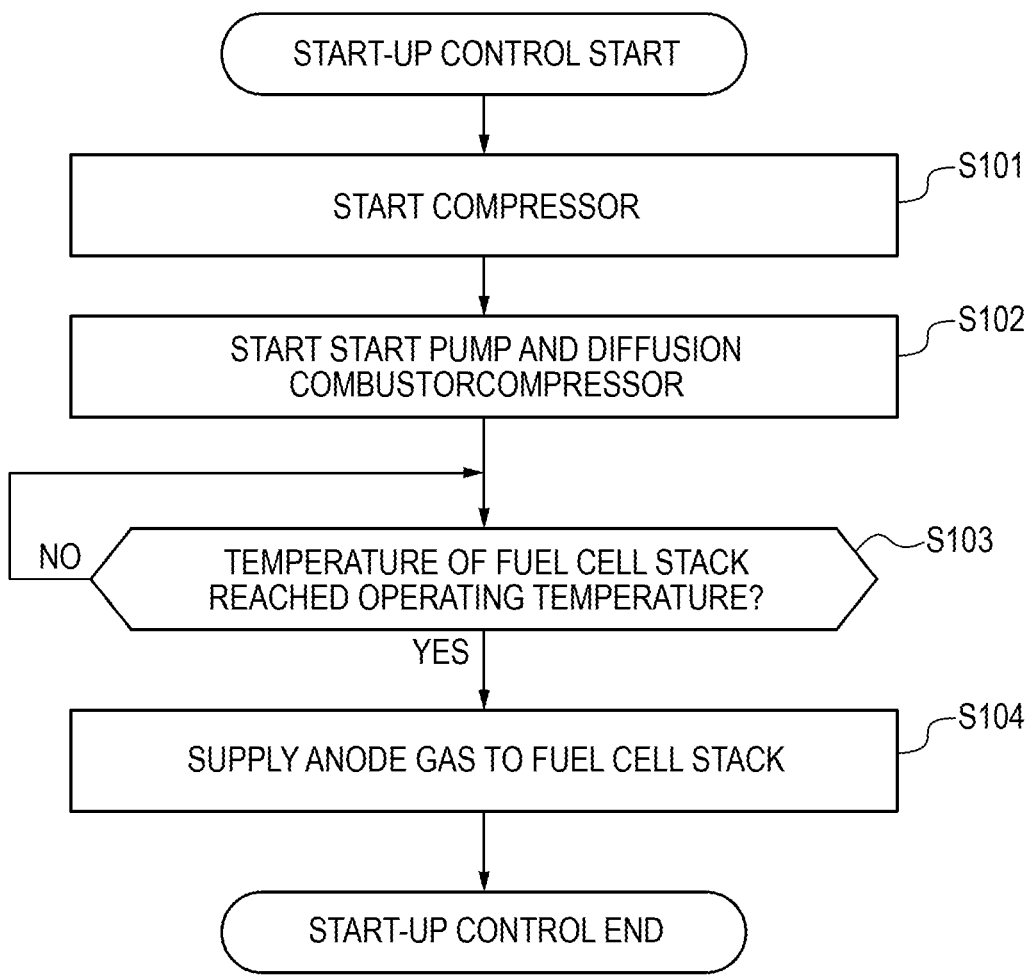
FIG. 9 is a flow chart showing an example of a method for starting the fuel cell system.

FIG. 9 is a flow chart showing a process procedure example relating to a start-up control for starting the fuel cell system 11.

When the start-up control of the fuel cell system 11 is started, a control unit 6 starts the compressor 32 in Step S101 and opens each of a cathode flow rate control valve 34, an anode system air supply valve 341 and the control valve 342 to a fixed opening degree. In this way, air (combustion gas) is supplied to the diffusion combustor 352 and the catalytic combustor 353. In Step S102, the control unit 6 starts the pump 21 and the diffusion combustor 352 (ignition device) and opens the control valves 231 to 233. In this way, the heating fuel is supplied to each of the diffusion combustor 352, the catalytic combustor 353 and the exhaust combustor 40. Then, the preheating burner is formed in the diffusion combustor 352, the combustion gas is generated in the catalytic combustor 353 utilizing this preheating burner, and the combustion gas passes through the fuel cell stack 1 to heat the fuel cell stack 1. Further, the combustion gas passed through the fuel cell stack 1 reaches the exhaust combustor 40 and the exhaust combustor 40 is heated and a heat exchanger 25 is heated by catalytic combustion with the heating fuel. Further, an evaporator 24 and the heat exchanger 351 are heated by discharged gas from the exhaust combustor 40.

In Step S103, the control unit 6 determines whether or not a temperature of the fuel cell stack 1 has reached an operating temperature necessary for power generation. Here, as a method for determining the temperature of the fuel cell stack 1, the fuel cell stack 1 may be determined to have reached the operating temperature, for example, if a temperature of the combustion gas detected by a temperature sensor 63 exceeds a certain value.

It should be noted that it is originally necessary to judge whether or not a proper temperature for reforming the reforming fuel well has been reached for the evaporator 24, the heat exchanger 25 and the reformer 26, but this is not necessary if the times required for these to reach the proper temperatures are shorter than a time required for the temperature of the fuel cell stack 1 to reach the operating temperature.

If the control unit 6 judges that the temperature of the fuel cell stack 1 has reached the operating temperature in Step S103, the control unit 6 stops the diffusion combustor 352, closes each of the control valves 342, 231, 232 and 233 and opens the fuel supply valve 23 in Step S104. In this way, the reforming fuel from a fuel tank 20 becomes anode gas (fuel gas) via the evaporator 24, the heat exchanger 25 and the reformer 26 and this anode gas is supplied to the anode electrode of the fuel cell stack 1. On the other hand, air continues to be supplied from the cathode flow rate control valve 34, is heated in the heat exchanger 351 and supplied as cathode gas (oxidant gas) to the fuel cell stack 1. Then, an electrochemical reaction by the anode gas and the cathode gas starts in the fuel cell stack 1, whereby power is normally generated and the start-up control is finished.

Next, an operation during normal power generation of the fuel cell system 11 is described.

During normal power generation of the fuel cell system 11, the reforming fuel supplied from the fuel tank 20 is first vaporized by the evaporator 24, the vaporized reforming fuel is heated by the heat exchanger 25 and reformed into anode gas in the reformer 26, and this anode gas is supplied to the anode electrode of the fuel cell stack 1. On the other hand, air serving as the cathode gas is heated by the heat exchanger 351 and supplied to the cathode electrode of the fuel cell stack 1 through the diffusion combustor 352 and the catalytic combustor 353. In the fuel cell stack 1 having the anode gas and the cathode gas supplied thereto, power is generated by an electrochemical reaction and supplied to the DC/DC converter 51, and anode off-gas and cathode off-gas used in the electrochemical reaction are introduced to the exhaust combustor 40. Then, the anode off-gas and the cathode off-gas are burned to become discharged gas while being mixed, and this discharged gas heats the evaporator 24 and the heat exchanger 351.

Next, an operation when the fuel cell system 11 is stopped is described.

Figure 10:
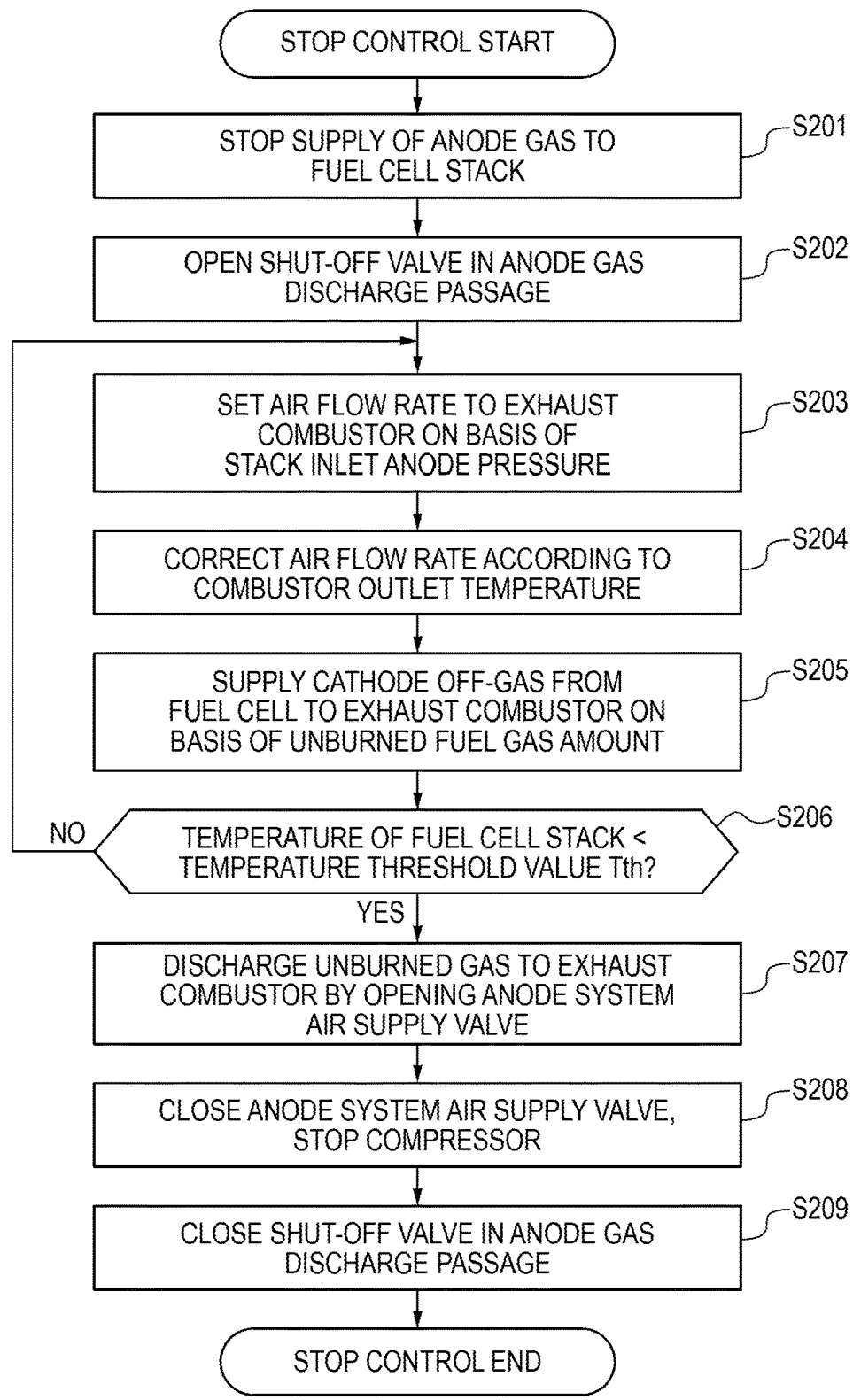
FIG. 10 is a flow chart showing an example of a method for stopping the fuel cell system.

FIG. 10 is a flow chart showing a process procedure example relating to a stop control for stopping the fuel cell system 11.

As shown in FIG. 10, when the fuel cell system 11 starts the stop control, the control unit 6 stops the pump 21 and closes the fuel supply valve 23 in Step S201. Since the supply of the anode gas to the fuel cell stack 1 is stopped in this way, power generation of the fuel cell stack 1 is stopped. Further, the control unit 6 closes the anode system air supply valve 341.

In Step S202, the control unit 6 keeps the shut-off valve 28 provided in the anode gas discharge passage 29 in a valve open state without closing the shut-off valve 28 after the supply of the anode gas is stopped. In this way, unburned fuel gas is discharged to the exhaust combustor 40 through the fuel cell stack 1 due to a pressure difference between a pressure in the anode gas supply passage 22 and an outlet pressure of the exhaust combustor 40 after the start of the stop control.

In Step S203, the control unit 6 obtains a stack inlet anode pressure from a pressure sensor 61 and calculates a target air flow rate corresponding to an air flow rate map determined in advance as in the processing of Step S922d of FIG. 6. The air flow rate necessary to burn the unburned fuel gas to be discharged to the exhaust combustor 40 is set for each stack inlet anode pressure in the air flow rate map.

In Step S204, the control unit 6 obtains a combustor outlet temperature from a temperature sensor 64 as in the processing of Step S922c of FIG. 4 and reduces the target air flow rate as the combustor outlet temperature decreases within a range where air is not lacking in the exhaust combustor 40. Specifically, the control unit 6 corrects the target air flow rate according to the temperature of the exhaust combustor 40. In this way, the temperature of the exhaust combustor 40 can be maintained at a temperature suitable for combustion.

In Step S205, the control unit 6 continues to drive the compressor 32 and controls the opening degree of the cathode flow rate control valve 34 on the basis of the target air flow rate calculated in Step S204. Since the flow rate of air to be supplied to the fuel cell stack 1 is adjusted to the target air flow rate in this way, the unburned fuel gas discharged through the fuel cell stack 1 can be burned in the exhaust combustor 40. Further, the inside of the fuel cell stack 1 can be cooled by the air supplied from the compressor 32 to the cathode electrode of the fuel cell stack 1.

In Step S206, the control unit 6 judges whether or not the internal temperature of the fuel cell system 11 has dropped to a temperature at which an oxidation reaction of the anode electrode of the fuel cell stack 1 is less likely to occur. In the present embodiment, the control unit 6 judges whether or not the temperature of the fuel cell stack 1 has dropped below a temperature threshold value Tth as in the processing of Step S923a of FIG. 4.

In Step S207, the control unit 6 supplies a predetermined amount of air to the anode gas supply passage 22 by opening the anode system air supply valve 341 if the temperature of the fuel cell stack 1 has dropped below the temperature threshold value Tth. In this way, the unburned fuel gas staying inside the reformer 26 and the fuel cell stack 1 is pushed out to the exhaust combustor 40. Then, the air supplied from the cathode flow rate control valve 34 to the exhaust combustor 40 through the fuel cell stack 1 and the unburned fuel gas are burned and gas generated after combustion is discharged to the atmosphere.

In Step S208, the control unit 6 closes both the anode system air supply valve 341 and the cathode flow rate control valve 34 and stops the driving of the compressor 32 after the unburned fuel gas staying inside the fuel cell system 11 is burned in the exhaust combustor 40.

In Step S209, the control unit 6 prevents a back flow of gas containing oxygen in the anode gas discharge passage 29 and the discharge of remaining gas not scavenged from the anode gas supply passage 22 by closing the shut-off valve 28. It should be noted that the shut-off valve 28 is opened at the next start-up.

According to the third embodiment of the present invention, similarly to the first and second embodiments, the unburned fuel gas discharged from the fuel cell stack 1 can be burned in the exhaust combustor 40 by supplying air to the exhaust combustor 40 in the case of stopping the fuel cell system 11. In this way, the discharge amount of the unburned fuel gas to be discharged from an exhaust passage 41 through the fuel cell stack 1 can be reduced at the next start-up of the fuel cell system 11.

Although the embodiments of the present invention have been described above, the above embodiments are merely an illustration of some application examples of the present invention and not intended to limit the technical scope of the present invention to the specific configurations of the above embodiments.

For example, the fuel cell system 10 or 11 includes the bypass passage branched from the cathode gas supply passage 33 located between the cathode flow rate control valve 34 and the fuel cell stack 1 and joining the cathode gas discharge passage 39, and the control valve for controlling the flow rate of the cathode gas flowing in that bypass passage. The control unit 6 may open the control valve in the bypass passage until the forced discharge timing is reached after the reception of the stop command signal. In this way, the predetermined amount of air necessary to burn the unburned fuel gas can be supplied to the exhaust combustor 40 without cooling the fuel cell stack 1 by the air if the temperature of the fuel cell stack 1 is not lowered until a specified period elapses, taking into account that the fuel cell system is immediately restarted.

Further, although the present invention is applied to the fuel cell system with the solid oxide fuel cell in the above embodiments, there is no limitation to this. For example, the present invention can be applied also to such a fuel cell system that fuel off-gas and oxidant off-gas discharged from a polymer electrolyte fuel cell are burned in a combustor and a turbine is driven by that combustion gas.

Furthermore, although the air flow rate to the exhaust combustor 40 is controlled to decrease so as not excessively reduce the temperature of the exhaust combustor 40 in the stop control of the fuel cell system in the above embodiments, the exhaust combustor 40 may be provided with a heater and heated by the heater. In this way, it is possible to avoid a situation where oxygen becomes insufficient in the exhaust combustor 40 according to a reduction of the air flow rate to the exhaust combustor 40.

Further, although the inlet pressure of the fuel cell stack 1 is detected and that detection value is used as the pressure in the anode gas supply passage 22 in the above embodiments, an inlet pressure of the reformer 26 or an inlet pressure of the heat exchanger 25 may be used. Also in this case, functions and effects similar to those of the second embodiment can be obtained.

It should be noted that the above embodiments can be combined as appropriate.

The present application claims a priority based on Japanese Patent Application No. 2015-244426 filed on Dec. 15, 2015, all the contents of which are incorporated hereby by reference.

The invention claimed is:

1. A control method for a fuel cell system with an oxidant supplying device configured to supply oxidant gas to a fuel cell, a fuel supplying device configured to supply fuel gas to the fuel cell and a combustor configured to burn fuel off-gas and oxidant off-gas discharged from the fuel cell and discharge thereof, comprising:
   a power generation control step of supplying the fuel gas and the oxidant gas to the fuel cell and causing the fuel cell to generate power; and
   a stop control step of stopping the supply of the fuel gas to the fuel cell and supplying the oxidant gas to the combustor on the basis of an amount of unburned fuel gas of the fuel cell system in the case of stopping the fuel cell system.

2. The control method for the fuel cell system according to claim 1, wherein:
   the oxidant gas is supplied to the combustor utilizing a bypass passage of the fuel cell by the oxidant supplying device in the stop control step.

3. The control method for the fuel cell system according to claim 1, wherein:
   the fuel off-gas is discharged to the combustor by supplying the oxidant gas to a fuel passage for passing the fuel gas to the fuel cell after a predetermined period from the stop of the fuel cell in the case of stopping the fuel cell system, in the stop control step.

4. The control method for the fuel cell system according to claim 3, wherein:
   the predetermined period is determined on the basis of a temperature of the fuel cell.

5. The control method for the fuel cell system according to claim 3, wherein:
   the predetermined period is determined on the basis of an anode gas pressure of the fuel cell.

6. The control method for the fuel cell system according to claim 5, wherein:
   the unburned fuel gas is discharged to the combustor by applying a counter electromotive force to the fuel cell from outside and supplying the oxidant gas to the fuel passage after the predetermined period in the case of stopping the fuel cell system, in the stop control step.

7. The control method for the fuel cell system according to claim 3, wherein:
   the fuel supplying device includes a reformer configured to reform the fuel gas heated by the combustor;
   the oxidant supplying device includes a branch passage branched from an oxidant passage for passing the oxidant gas to the fuel cell and joining the fuel passage located upstream of the reformer; and
   the unburned fuel gas discharged from the reformer is burned in the combustor by supplying the oxidant gas from the branch passage to the fuel passage by the oxidant supplying device in the case of stopping the fuel cell system, in the stop control step.

8. The control method for the fuel cell system according to claim 7, wherein:
   the oxidant supplying device further includes a control valve provided in the branch passage and configured to control a flow rate of the oxidant gas to be supplied to the reformer; and
   the control valve is opened when at least one parameter out of a pressure in the fuel passage, a temperature of the fuel cell and an elapsed time after receiving a stop command exceeds a predetermined threshold value in the case of receiving the stop command, in the stop control step.

9. The control method for the fuel cell system according to claim 8, wherein:
   the stop control step further includes:
   a calculation step of calculating a temperature of the fuel cell on the basis of the temperature of the fuel gas to be supplied to the fuel cell and a temperature of the fuel off-gas discharged from the fuel cell; and
   an oxidant supply step of opening the control valve so as to supply the oxidant gas to the fuel passage if the temperature of the fuel cell drops below a temperature threshold value determined to suppress the oxidation of the fuel cell.

10. The control method for the fuel cell system according to claim 8, wherein:
    the control valve is closed and the oxidant gas is supplied to the oxidant passage or a bypass passage branched from the oxidant passage and joining an exhaust passage of the fuel cell until the predetermined period elapses, in the stop control step.

11. The control method for the fuel cell system according to claim 1, wherein:
    the oxidant gas is supplied to the combustor at a predetermined flow rate determined by the amount of the unburned fuel gas in the case of stopping the fuel cell system, in the stop control step.

12. The control method for the fuel cell system according to claim 11, wherein:
    the flow rate of the oxidant gas is gradually reduced in the case of stopping the fuel cell system, in the stop control step.

13. The control method for the fuel cell system according to claim 1, wherein:
    the fuel cell system further includes a temperature sensor configured to detect a temperature of the combustor; and
    a flow rate of the oxidant gas to the combustor is reduced according to the temperature of the combustor detected by the temperature sensor, in the stop control step.

14. The control method for the fuel cell system according to claim 1, wherein:
    the fuel cell system further includes a pressure sensor configured to detect a pressure in a fuel passage for passing the fuel gas to the fuel cell; and
    a flow rate of the oxidant gas is reduced on the basis of the pressure in the fuel passage detected by the pressure sensor or a pressure difference between the pressure in the fuel passage and a pressure of the combustor, in the stop control step.

15. The control method for the fuel cell system according to claim 1, wherein:
    the fuel cell system further includes a power controller connected to the fuel cell and configured to extract power of the fuel cell and supply the power to a secondary battery; and
    a counter electromotive force is applied to the fuel cell by the power controller in the case of stopping the fuel cell system, in the stop control step.

16. A fuel cell system, comprising:
    a fuel cell configured to generate power using fuel gas and oxidant gas;
    an oxidant supplying device configured to supply the oxidant gas to the fuel cell;
    a fuel supplying device configured to supply the fuel gas to the fuel cell;
    a combustor configured to burn mixture gas mixed by introduced fuel off-gas and oxidant off-gas discharged from the fuel cell and discharge thereof; and
    a control unit configured to cause the fuel cell to generate power by supplying the fuel gas and the oxidant gas to the fuel cell;
    the control unit stopping the supply of the fuel gas to the fuel cell and supplying the oxidant gas to the combustor on the basis of an amount of unburned fuel gas of the fuel cell system in the case of stopping the fuel cell system.

* * * * *